(12) United States Patent
Tonami

(10) Patent No.: US 7,542,385 B2
(45) Date of Patent: Jun. 2, 2009

(54) OPTICAL DISK UNIT AND ABERRATION CORRECTING METHOD USED FOR THIS

(75) Inventor: Junichiro Tonami, Yokohama (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 617 days.

(21) Appl. No.: 10/538,488

(22) PCT Filed: Dec. 3, 2003

(86) PCT No.: PCT/JP03/15469

§ 371 (c)(1),
(2), (4) Date: Jun. 9, 2005

(87) PCT Pub. No.: WO2004/053856

PCT Pub. Date: Jun. 24, 2004

(65) Prior Publication Data

US 2006/0114793 A1  Jun. 1, 2006

(30) Foreign Application Priority Data

Dec. 10, 2002  (JP)  .............................. 2002-357947

(51) Int. Cl.
*G11B 7/0045* (2006.01)
(52) U.S. Cl. .............................. 369/44.23; 369/112.23; 369/44.32
(58) Field of Classification Search .............. 369/44.23, 369/44.11, 44.25, 44.34, 53.12, 112.01, 112.02, 369/112.03, 112.1, 44.32
See application file for complete search history.

(56) References Cited

U.S. PATENT DOCUMENTS

| | | | | |
|---|---|---|---|---|
| 6,728,179 | B1 * | 4/2004 | Nakano et al. | 369/53.1 |
| 7,020,055 | B2 * | 3/2006 | Kim et al. | 369/44.41 |
| 7,151,735 | B2 * | 12/2006 | Arai et al. | 369/112.05 |
| 7,277,365 | B2 * | 10/2007 | Yasuda et al. | 369/44.27 |
| 2002/0060958 | A1 * | 5/2002 | Ando et al. | 369/44.23 |

(Continued)

FOREIGN PATENT DOCUMENTS

EP          1 223 576 A2      7/2002

(Continued)

*Primary Examiner*—Wayne R Young
*Assistant Examiner*—Thomas D Alunkal
(74) *Attorney, Agent, or Firm*—The Nath Law Group; Jerald L. Meyer; Sungyeop Chung

(57) ABSTRACT

An optical disk unit capable of correcting a spherical aberration without using special patterns is provided. Also provided is an aberration correcting method used for such an optical disk unit. An objective lens 7 is moved along an optical axis by a predetermined distance from an in-focus position in a first direction, and then, is moved by the predetermined distance from the in-focus position in a second direction that is opposite to the first direction. In each of the objective lens moved states, a random signal having a plurality of amplitudes and periods is reproduced from an optional area of an information recording layer 12 of an optical disk 11. A servo circuit 10 extracts a specific portion having a specific amplitude or period from the reproduced random signal in each of the objective lens moved states, finds a first amplitude value and second amplitude value in the specific portions, and controls an aberration corrector 6 so that the difference between the first amplitude value and the second amplitude value approaches zero.

14 Claims, 31 Drawing Sheets

U.S. PATENT DOCUMENTS

| | | | |
|---|---|---|---|
| 2002/0101798 A1* | 8/2002 | Kim et al. | 369/44.23 |
| 2002/0114231 A1 | 8/2002 | Shirakawa et al. | |
| 2002/0150016 A1* | 10/2002 | Yasuda et al. | 369/53.22 |
| 2003/0007431 A1* | 1/2003 | Tateishi | 369/44.23 |
| 2003/0063533 A1* | 4/2003 | Kim et al. | 369/44.41 |

FOREIGN PATENT DOCUMENTS

| | | |
|---|---|---|
| JP | 2000-011388 | 1/2000 |
| JP | 2000-040237 | 2/2000 |
| JP | 2002-150569 | 5/2002 |
| JP | 2003-196856 | 7/2003 |
| JP | 2003-233917 | 8/2003 |

* cited by examiner

INPUT VALUE/OUTPUT VALUE

SPHERICAL ABERRATION ON "−" SIDE

NO SPHERICAL ABERRATION

SPHERICAL ABERRATION ON "+" SIDE

OPTICAL DISK UNIT AND ABERRATION CORRECTING METHOD USED FOR THIS

TECHNICAL FIELD

The present invention relates to an optical disk unit for recording and reproducing information to and from an optical disk and an aberration correcting method used for the optical disk unit. In particular, the present invention relates to an optical disk unit capable of correcting a spherical aberration of a condensed beam spot caused when the thickness of a transparent substrate of an optical disk is out of specification values and conducting a recording or reproducing operation with a proper condensed beam spot. It also relates to an aberration correcting method used for such an optical disk unit.

BACKGROUND TECHNOLOGY

In recent years, various optical disks such as CDs (compact disks) and DVDs (digital versatile disks) have been practically used as high-density information recording media. Recording and reproducing information to and from an optical disk are carried out with an optical disk unit having an optical system that emits a laser beam and forms a small condensed beam spot on an information recording layer of the optical disk.

More precisely, an optical disk 11 shown in FIG. 1 has an information recording layer 12. The information recording layer 12 is covered with a transparent substrate 13. In the information recording layer 12, information is written with record pits that are of the order of micrometers and are arranged in concentric circles or spirals. The transparent substrate 13 is made of transparent resin such as polycarbonate to protect the information recording layer 12 and provide the optical disk 11 with mechanical strength. An optical disk unit has a light guiding system to guide a recording or reproducing laser beam to the optical disk 11. From the laser beam, an objective lens (condenser lens) 14 in a condensing optical system arranged in the last stage of the optical disk unit forms a condensed beam spot 15 on the surface of the information recording layer 12.

The optical disk 11 shown in FIG. 1 is a two-sided recording optical disk with each face of the information recording layer 12 is covered with the transparent substrate 13. If it is a one-sided recording optical disk, the transparent substrate may be formed only over a recording side.

In recent years, optical disks are increasingly provided with large capacities and high densities. To catch up the tendency, the numerical aperture of the objective lens 14 for forming the condensed beam spot 15 is increased. The numerical aperture of an objective lens used for conventional CDs is 0.45 and that for high-density recordable DVDs is 0.6. Objective lenses having a numerical aperture of 0.8 or greater are expected.

In these circumstances, accuracy of the thickness t of the transparent substrate 13 on the optical disk 11 is very important when recording and reproducing information to and from the optical disk. The transparent substrate 13 has a refractive index. If the thickness t of the transparent substrate 13 is out of specification values when the objective lens 14 forms the condensed beam spot 15 on the optical disk, the condensed beam spot 15 will have a spherical aberration. As the numerical aperture of the objective lens 14 increases, the spherical aberration increases to heighten the possibility of causing a recording or reproducing error. If the objective lens has a numerical aperture of, for example, 0.85, an allowance for the thickness t of the transparent substrate 13 of the standard optical disk 11 is said to be several micrometers or smaller. Securing this accuracy is difficult even with the current technology of optical disk manufacturing.

FIGS. 2A and 2B show changes in light intensity distribution around an optical axis of the condensed beam spot 15 with respect to focus offsets. A dot-and-dash line indicates the optical axis of a laser beam. In FIG. 2A, the thickness t of the transparent substrate 13 is within an allowance, and in FIG. 2B, the thickness t of the transparent substrate 13 is out of the allowance. In FIG. 2A, the thickness t of the transparent substrate 13 is within the allowance, and the light intensity distribution of the condensed beam spot 15 shows that the diameter of the beam substantially symmetrically changes around a focal point.

In FIG. 2B, the thickness t of the transparent substrate 13 is out of the allowance, and there is a spherical aberration that causes concentric wavefront variations around the optical axis. As a result, the light intensity distribution of the condensed beam spot 15 shows asymmetrical changes around the focal point. The light intensity distribution shows irregular variations in beam diameter and produces side lobes that increase in proportion to focus offsets.

If the thickness t of the transparent substrate 13 is out of an allowance, the optical disk unit must correct a spherical aberration of the condensed beam spot 15 with some technique so that the condensed beam spot 15 may properly conduct recording and reproducing. There is a conventional method for correcting a spherical aberration of the condensed beam spot 15 caused when the thickness t of the transparent substrate 13 of the optical disk 11 is out of specification values. The method is disclosed in Japanese Unexamined Patent Application Publication No. 2002-150569 (hereinafter referred to as the Patent Document 1).

The spherical aberration correcting method disclosed in the Patent Document 1 will be explained. In a lead-in area (not shown) of the optical disk 11, the method forms a special pattern. In the special pattern, two kinds of pit strings 107 and 108 having different periods are alternately arranged as shown in FIG. 3A. According to the example of FIG. 3A, the period of the pit string 107 is longer than that of the pit string 108. A reproduced signal from the pit strings 107 and 108 has a signal waveform shown in FIG. 3B. A reproduced portion corresponding to the pit string 107 has a larger amplitude, and a reproduced portion corresponding to the pit string 108 has a smaller amplitude.

According to the Patent Document 1, the focal point of the condensed beam spot 15 is successively changed, to find characteristics between focus offsets and amplitudes as shown in FIGS. 4A and 4B, and according to the characteristics, the related art corrects a spherical aberration.

The characteristics of FIG. 4A are obtained when the thickness t of the transparent substrate 13 is within an allowance, and those of FIG. 4B are obtained when the thickness t of the transparent substrate 13 is out of the allowance. In FIGS. 4A and 4B, a continuous line represents changes in the amplitude of a reproduced signal from the long-period pit string 107, and a dotted line represents changes in the amplitude of a reproduced signal from the short-period pit string 108.

In FIG. 4A, there is substantially no spherical aberration. In this case, the amplitudes of the reproduced signals obtained from the condensed beam spot 15 are substantially symmetrical before and after (left and right in the figure) a focal point. In FIG. 4B, there is a spherical aberration. In this case, the amplitudes of the reproduced signals are asymmetrical before and after a focal point.

In FIG. 4B, fo1 and fo2 are focus offsets that provide maximum amplitudes for the reproduced signals from the long-period pit string 107 indicated with a continuous line and short-period pit string 108 indicated with a dotted line, respectively. The focus offsets fo1 and fo2 correspond to a spherical aberration caused by an error of the thickness t of the transparent substrate 13 exceeding the allowance. The signs of the focus offsets fo1 and fo2 that provide the maximum amplitudes of reproduced signals will invert depending on whether the thickness t of the transparent substrate 13 is thicker or thinner than the allowance. Accordingly, it is possible to determine not only the degree of the spherical aberration but also the direction thereof. The aberration shown in FIG. 4B is referred to as an aberration of positive direction.

Controlling an optical system in such a way as to eliminate (minimize) the focus offsets fo1 and fo2 will correct the spherical aberration and optimize the condensed beam spot 15. This is the spherical aberration correcting method disclosed in the Patent Document 1.

SUMMERY OF INVENTION

The spherical aberration correcting method stipulated in the above-mentioned Patent Document 1 must beforehand record the long-period pit string 107 and short-period pit string 108 of FIG. 3A in the optical disk 11. This method, therefore, is inapplicable to read-only optical disks (ROM disks) already standardized. For writable and rewritable optical disks (R, RW, and RAM disks), an optical disk unit must have a generator for generating information signals to record the long-period pit string 107 and short-period pit string 108.

In addition, the spherical aberration correcting method of the Patent Document 1 must successively shift the focal point of the condensed beam spot 15 and find the focus offsets fo1 and fo2 that produce maximum amplitudes on reproduced signals. Accordingly, the related art needs a long time to detect and correct a spherical aberration.

In consideration of the problems, an object of the present invention is to provide an optical disk unit that needs no preparation of special patterns for correcting a spherical aberration, as well as an aberration correcting method used for such an optical disk unit. Another object of the present invention is to provide an optical disk unit capable of correcting a spherical aberration on any one of a read-only optical disk and a writable/rewritable optical disk, as well as an aberration correcting method used for such an optical disk unit. Still another object of the present invention is to provide an optical disk unit capable of quickly correcting a spherical aberration, as well as an aberration correcting method used for such an optical disk unit.

In order to accomplish the objects, the present invention provides an optical disk unit having reproducing means for reproducing information recorded in an information recording layer of an optical disk. The optical disk unit comprises a laser beam source; an aberration corrector to correct a spherical aberration by adjusting the diverging or converging angle of a laser beam emitted from the laser beam source; an objective lens to condense the laser beam and form a condensed beam spot on the information recording layer; a focus controller having a moving mechanism to move the objective lens along an optical axis of the laser beam, the focus controller moving the objective lens so that the condensed beam spot focuses on the information recording layer; detecting means for allowing the focus controller to move the objective lens by a predetermined distance from an in-focus position in a first direction, allowing the reproducing means to reproduce a random signal having a plurality of amplitudes and periods from an optional area of the information recording layer, extracting a specific portion having a specific amplitude or period from the reproduced random signal or an interpolated signal thereof, finding a first amplitude value in the specific portion, allowing the focus controller to move the objective lens by the predetermined distance from the in-focus position in a second direction that is opposite to the first direction, allowing the reproducing means to reproduce a random signal having a plurality of amplitudes and periods from the optional area of the information recording layer, extracting a specific portion having a specific amplitude or period from the reproduced random signal or an interpolated signal thereof, and finding a second amplitude value from the specific portion; and controlling means for controlling the aberration corrector so that the difference between the first amplitude value and the second amplitude value approaches zero.

It is preferable that the optical disk unit further comprises determining means for determining whether or not the information recording layer has a record to reproduce a random signal by the detecting means; and recording means for recording a random signal having a plurality of amplitudes and periods in the optional area of the information recording layer if the determining means determines that the information recording layer has no record to reproduce a random signal by the detecting means.

It is preferable that the optional area is an OPC area.

A preferable example of the detecting means is an envelope detector to detect envelopes in the specific portions and find the first and second amplitude values.

The present invention also provides an optical disk unit having reproducing means for reproducing information recorded in an information recording layer of an optical disk. The optical disk unit comprises a laser beam source; an aberration corrector to correct a spherical aberration by adjusting the diverging or converging angle of a laser beam emitted from the laser beam source; an objective lens to condense the laser beam and form a condensed beam spot on the information recording layer; a focus controller having a moving mechanism to move the objective lens along an optical axis of the laser beam, the focus controller moving the objective lens so that the condensed beam spot focuses on the information recording layer; detecting means for allowing the focus controller to move the objective lens by a predetermined distance from an in-focus position in a first direction, allowing the reproducing means to reproduce a random signal having a plurality of amplitudes and periods from an optional area of the information recording layer, extracting a first specific portion having a first specific amplitude or period and a second specific portion having a second specific amplitude or period from the reproduced random signal or an interpolated signal thereof, finding a first differential value between an amplitude value of the first specific portion and an amplitude value of the second specific portion, allowing the focus controller to move the objective lens by the predetermined distance from the in-focus position in a second direction that is opposite to the first direction, allowing the reproducing means to reproduce a random signal having a plurality of amplitudes and periods from the optional area of the information recording layer, extracting a third specific portion having a third specific amplitude or period and a fourth specific portion having a fourth specific amplitude or period from the reproduced random signal or an interpolated signal thereof, and finding a second differential value between an amplitude value of the third specific portion and an amplitude value of the fourth specific portion; and controlling means for controlling the aberration corrector so that the difference between the first differential value and the second differential value approaches zero.

It is preferable that the optical disk unit further comprises determining means for determining whether or not the information recording layer has a record to reproduce a random signal by the detecting means; and recording means for recording a random signal having a plurality of amplitudes and periods in the optional area of the information recording layer if the determining means determines that the information recording layer has no record to reproduce a random signal by the detecting means.

It is preferable that the optional area is an OPC area.

A preferable example of the detecting means comprises zero-cross detecting means for detecting a zero-cross point where the reproduced random signal or an interpolated signal thereof crosses a preset zero level; time interval detecting means for detecting a time interval between two adjacent zero-cross points; and extracting means for extracting the first to fourth specific portions according to time intervals detected by the time interval detecting means.

Another preferable example of the detecting means comprises zero-cross detecting means for detecting a zero-cross point where the reproduced random signal or an interpolated signal thereof crosses a preset zero level; partial response determining means for using zero-cross points detected by the zero-cross detecting means and the reproduced random signal or an interpolated signal thereof, to determine a target value for each sampling point of the reproduced random signal or an interpolated signal thereof according to run-length limitation and state transition determined by partial response characteristics; and extracting means for extracting the first to fourth specific portions according to target values determined by the partial response determining means.

The present invention also provides an optical disk unit having reproducing means for reproducing information recorded in an information recording layer of an optical disk. The optical disk unit comprises a laser beam source; an aberration corrector to correct a spherical aberration by adjusting the diverging or converging angle of a laser beam emitted from the laser beam source; an objective lens to condense the laser beam and form a condensed beam spot on the information recording layer; a focus controller having a moving mechanism to move the objective lens along an optical axis of the laser beam, the focus controller moving the objective lens so that the condensed beam spot focuses on the information recording layer; a waveform equalizer for setting a boost quantity for a signal reproduced by the reproducing means from information recorded in the information recording layer and equalizing the waveform of the reproduced signal; detecting means for allowing the focus controller to move the objective lens by a predetermined distance from an in-focus position in a first direction, allowing the reproducing means to reproduce a random signal having a plurality of amplitudes and periods from an optional area of the information recording layer, detecting a first boost quantity used by the waveform equalizer for the reproduced random signal, allowing the focus controller to move the objective lens by the predetermined distance from the in-focus position in a second direction that is opposite to the first direction, allowing the reproducing means to reproduce a random signal having a plurality of amplitudes and periods from the optional area of the information recording layer, and detecting a second boost quantity used by the waveform equalizer for the reproduced random signal; and controlling means for controlling the aberration corrector so that the difference between the first boost quantity and the second boost quantity approaches zero.

The present invention also provides an aberration correcting method used for an optical disk unit. The method comprises a reproducing step of reproducing a random signal having a plurality of amplitudes and periods from an optional area of an information recording layer of an optical disk; a focusing step of moving an objective lens along an optical axis, to condense a laser beam emitted from a laser beam source on the information recording layer and focus the condensed beam spot on the information recording layer; a first detecting step of moving the objective lens by a predetermined distance from the in-focus position set in the focusing step in a first optical axis direction, reproducing the random signal, extracting a specific portion having a specific amplitude or period from the reproduced random signal or an interpolated signal thereof, and finding a first amplitude value in the specific portion; a second detecting step of moving the objective lens by the predetermined distance from the in-focus position set in the focusing step in a second direction that is opposite to the first direction, reproducing the random signal, extracting a specific portion having a specific amplitude or period from the reproduced random signal or an interpolated signal thereof, and finding a second amplitude value in the specific portion; and a controlling step of controlling an aberration corrector that corrects a spherical aberration by adjusting the diverging or converging angle of the laser beam, so that the difference between the first amplitude value and the second amplitude value approaches zero.

Before the reproducing step, it is preferable to include a determining step of determining whether or not the information recording layer has a record to reproduce a random signal in the first and second detecting steps; and a recording step of recording a random signal having a plurality of amplitudes and periods in the optional area of the information recording layer if the determining step determines that the information recording layer has no record to reproduce a random signal in the first and second detecting steps.

It is preferable that the optional area is an OPC area.

Preferable examples of the first and second detecting steps are envelope detecting steps of detecting envelopes in the specific portions and finding the first and second amplitude values.

The present invention also provides an aberration correcting method used for an optical disk unit. The method comprises a reproducing step of reproducing a random signal having a plurality of amplitudes and periods from an optional area of an information recording layer of an optical disk; a focusing step of moving an objective lens along an optical axis, to condense a laser beam emitted from a laser beam source on the information recording layer and focus the condensed beam spot on the information recording layer; a first detecting step of moving the objective lens by a predetermined distance from the in-focus position set in the focusing step in a first optical axis direction, reproducing the random signal, extracting a first specific portion having a first specific amplitude or period and a second specific portion having a second specific amplitude or period from the reproduced random signal or an interpolated signal thereof, and finding a first differential value between an amplitude value of the first specific portion and an amplitude value of the second specific portion; a second detecting step of moving the objective lens by the predetermined distance from the in-focus position set in the focusing step in a second direction that is opposite to the first direction, reproducing the random signal, extracting a third specific portion having a third specific amplitude or period and a fourth specific portion having a fourth specific amplitude or period from the reproduced random signal or an interpolated signal thereof, and finding a second differential value between an amplitude value of the third specific portion and an amplitude value of the fourth specific portion; and a controlling step of controlling an aberration corrector that corrects a spherical aberration by adjusting the diverging or converging angle of the laser beam, so that the difference between the first differential value and the second differential value approaches zero.

Before the reproducing step, it is preferable to include a determining step of determining whether or not the information recording layer has a record to reproduce a random signal in the first and second detecting steps; and a recording step of recording a random signal having a plurality of amplitudes and periods in the optional area of the information recording layer if the determining step determines that the information recording layer has no record to reproduce a random signal in the first and second detecting steps.

It is preferable that the optional area is an OPC area.

Preferable examples of the first and second detecting steps include a zero-cross detecting step of detecting a zero-cross point where the reproduced random signal or an interpolated signal thereof crosses a preset zero level; a time interval detecting step of detecting a time interval between two adjacent zero-cross points; and an extracting step of extracting the first to fourth specific portions according to time intervals detected in the time interval detecting step.

Other preferable examples of the first and second detecting steps include a zero-cross detecting step of detecting a zero-cross point where the reproduced random signal or an interpolated signal thereof crosses a preset zero level; a partial response determining step of using zero-cross points detected in the zero-cross detecting step and the reproduced random signal or an interpolated signal thereof and determining a target value for a sampling point of the reproduced random signal or an interpolated signal thereof according to run-length limitation and state transition determined by partial response characteristics; and an extracting step of extracting the first to fourth specific portions according to target values determined in the partial response determining step.

The present invention also provides an aberration correcting method used for an optical disk unit. The method comprises a reproducing step of reproducing a random signal having a plurality of amplitudes and periods from an optional area of an information recording layer of an optical disk; a focusing step of moving an objective lens along an optical axis, to condense a laser beam emitted from a laser beam source on the information recording layer and focus the condensed beam spot on the information recording layer; a first waveform equalizing step of moving the objective lens by a predetermined distance from the in-focus position set in the focusing step in a first optical axis direction, reproducing the random signal, setting a first boost quantity for the reproduced random signal, and equalizing the waveform of the reproduced random signal; a first detecting step of detecting the first boost quantity set in the first waveform equalizing step; a second waveform equalizing step of moving the objective lens by the predetermined distance from the in-focus position set in the focusing step in a second direction that is opposite to the first direction, reproducing the random signal, setting a second boost quantity for the reproduced random signal, and equalizing the waveform of the reproduced random signal; a second detecting step of detecting the second boost quantity set in the second waveform equalizing step; and a controlling step of controlling an aberration corrector that corrects a spherical aberration by adjusting the diverging or converging angle of the laser beam, so that the difference between the first boost quantity and the second boost quantity approaches zero.

The optical disk units and aberration correcting method for the optical disk units according to the present invention are capable of correcting a spherical aberration without special patterns for correcting the spherical aberration. The present invention can correct a spherical aberration on any one of read-only optical disks, writable optical disks, and rewritable optical disks. Also, the present invention is capable of correcting a spherical aberration in a short time.

DETAILED DESCRIPTION OF EMBODIMENTS

Figure 5:
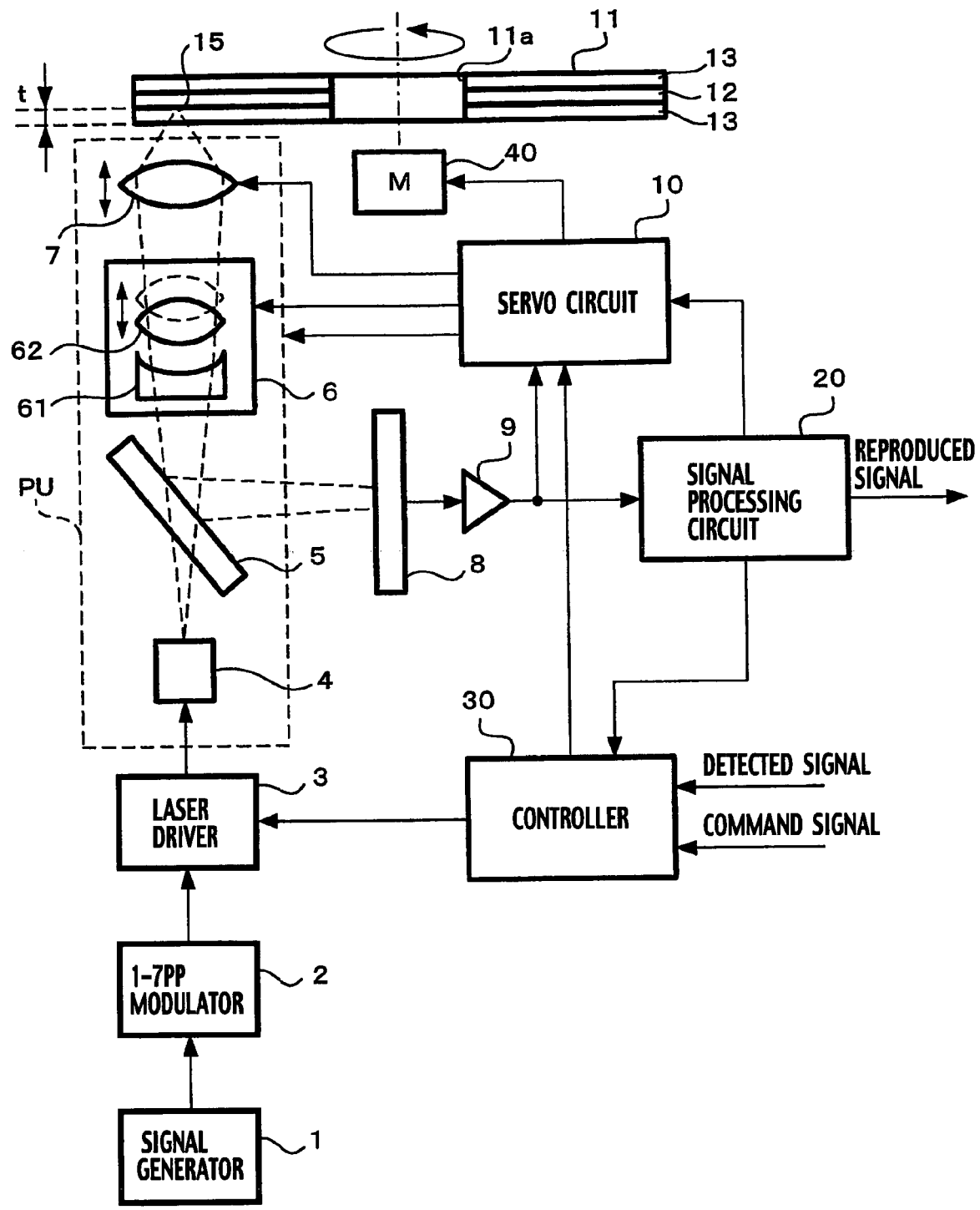
FIG. 5 is a block diagram showing a basic configuration of an optical disk unit according to first to seventh embodiments of the present invention.
Figure 6:
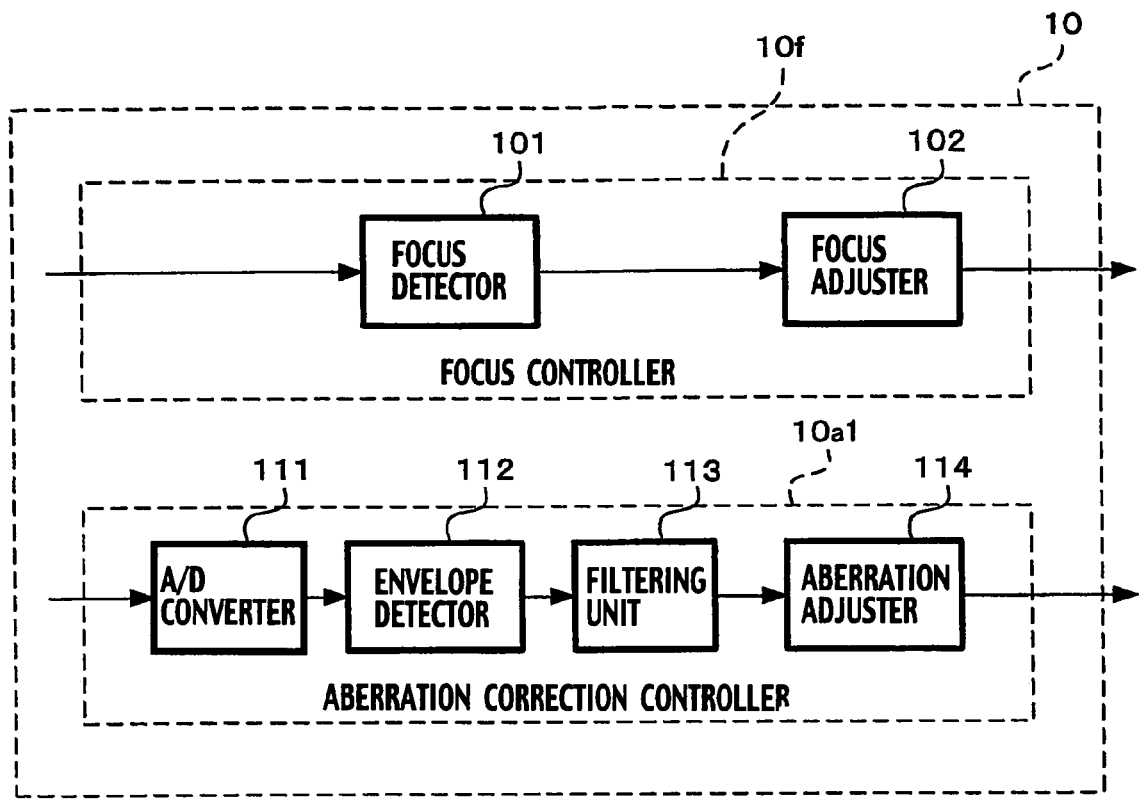
FIG. 6 is a block diagram showing the details of a configuration according to the first embodiment.
Figure 7:
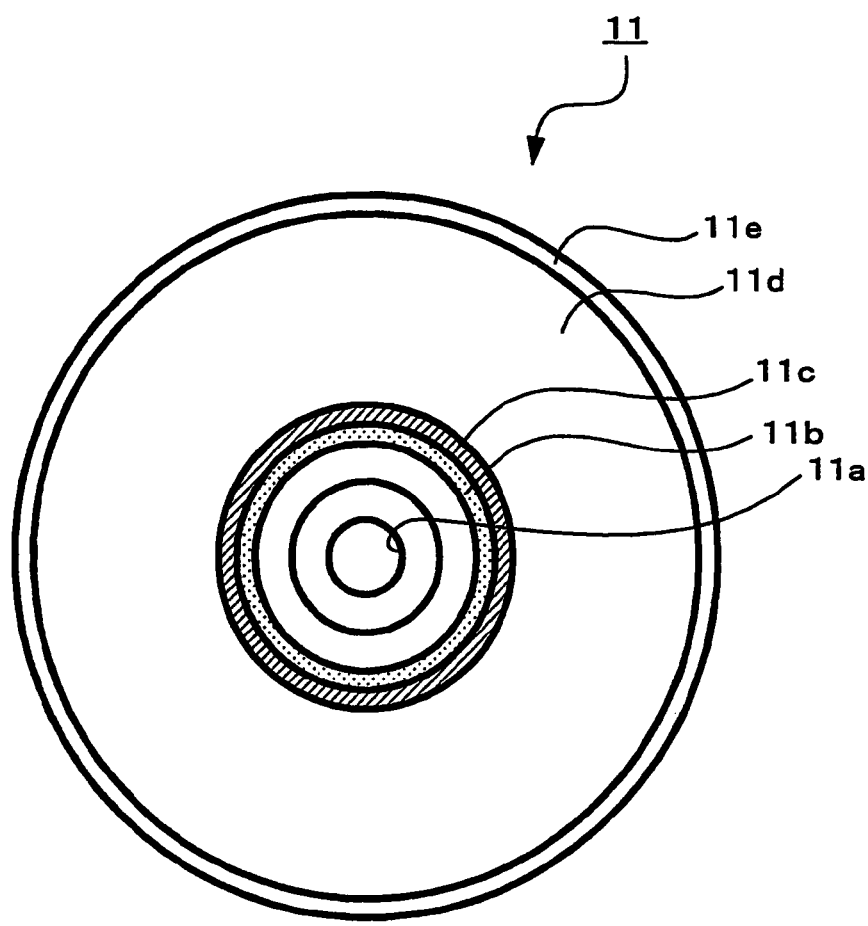
FIG. 7 is a plan view showing an example of an optical disk used for the optical disk unit according to the present invention.
Figure 8:
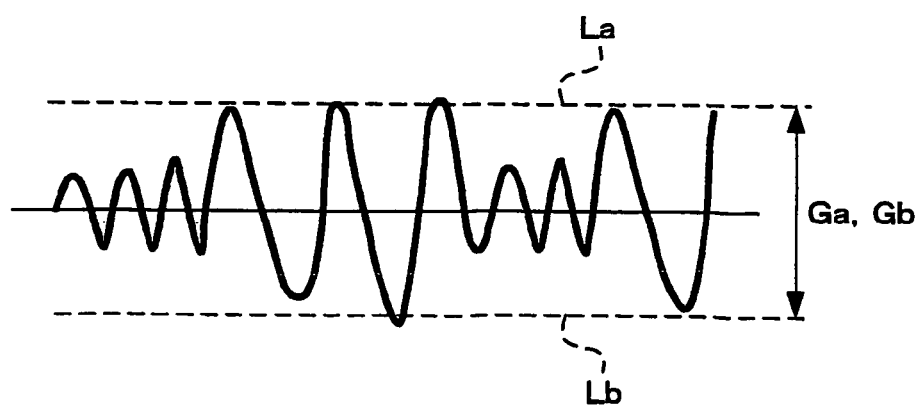
FIG. 8 is a waveform diagram showing an example of a reproduced signal according to the first embodiment.
Figure 9:
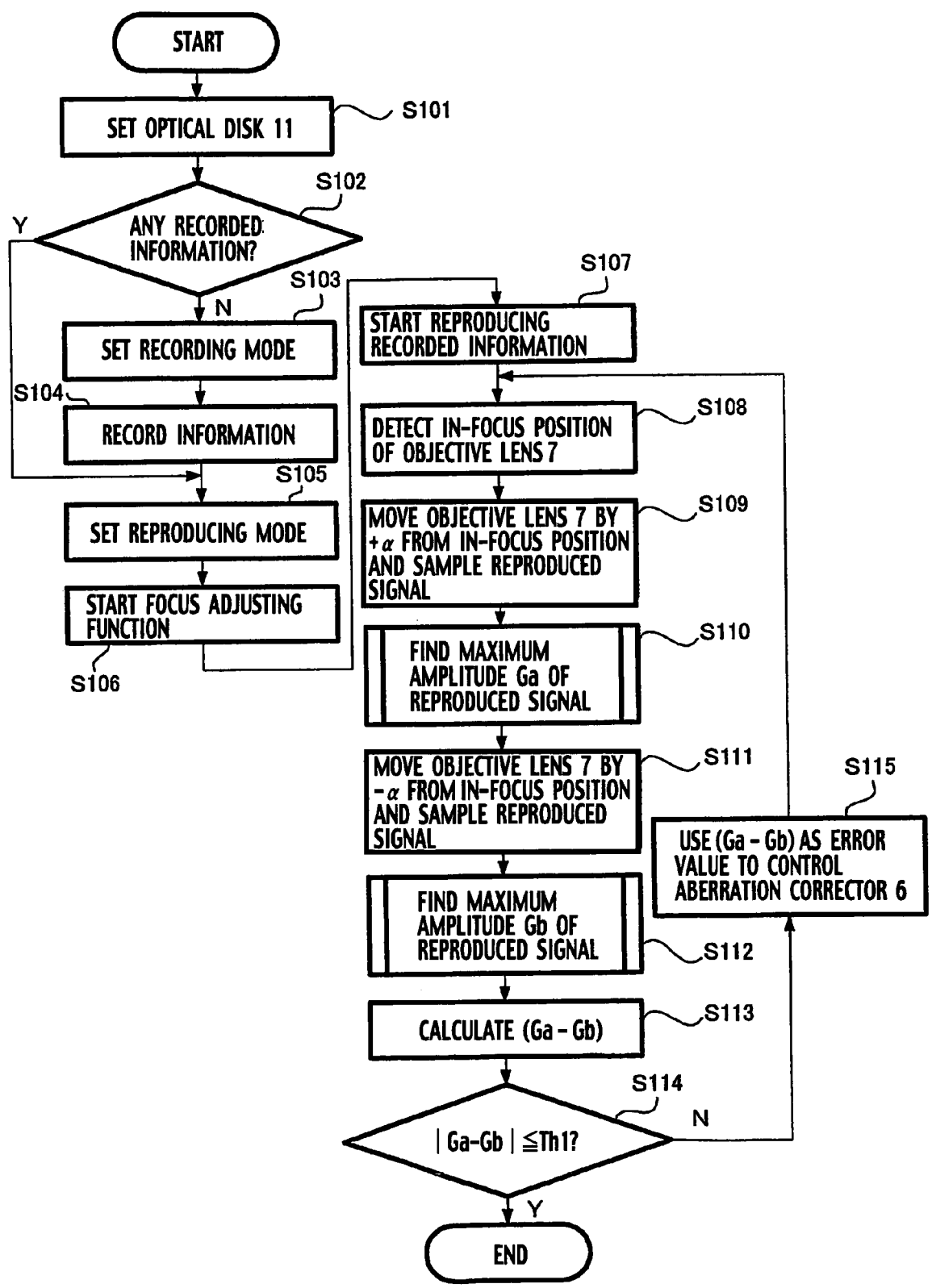
FIG. 9 is a flowchart showing an aberration correcting method according to the first embodiment.
Figure 10A:
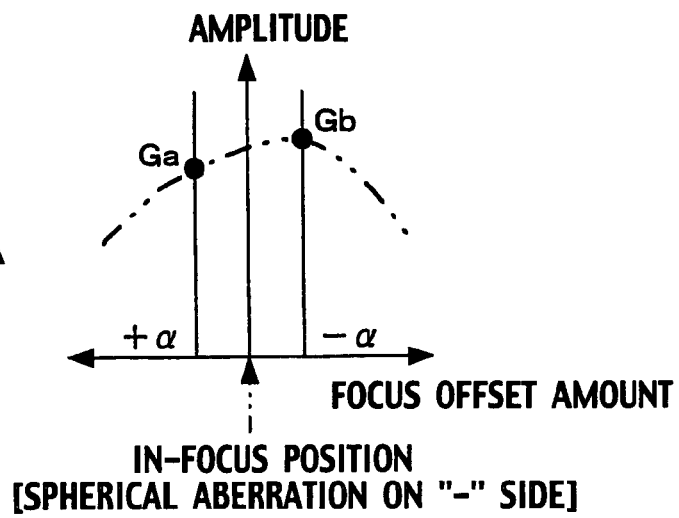
FIG. 10A is a characteristic diagram showing a state of spherical aberration according to the first embodiment.
Figure 10B:
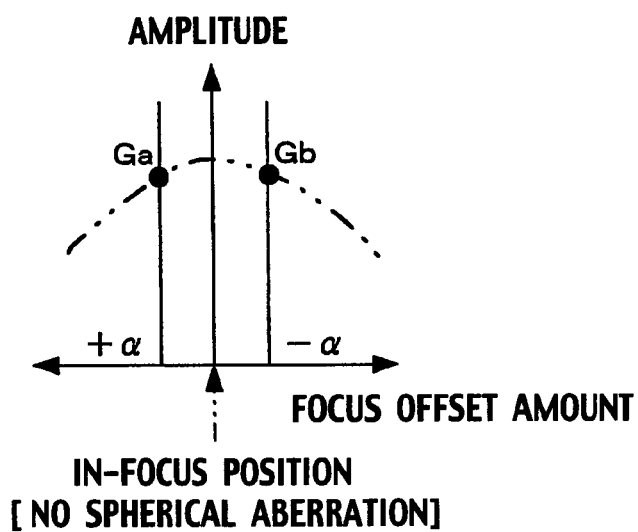
FIG. 10B is a characteristic diagram showing a state of spherical aberration according to the first embodiment.
Figure 10C:
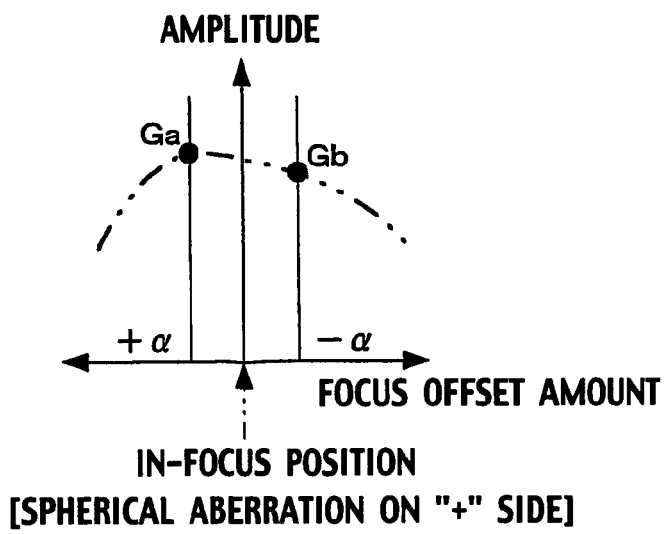
FIG. 10C is a characteristic diagram showing a state of spherical aberration according to the first embodiment.
Figure 11A:
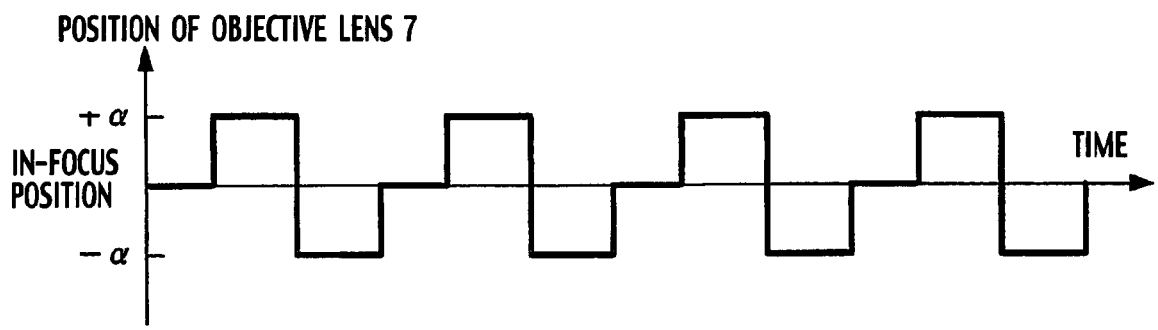
FIG. 11A is a timing chart explaining the aberration correcting method according to the first embodiment.
Figure 11B:
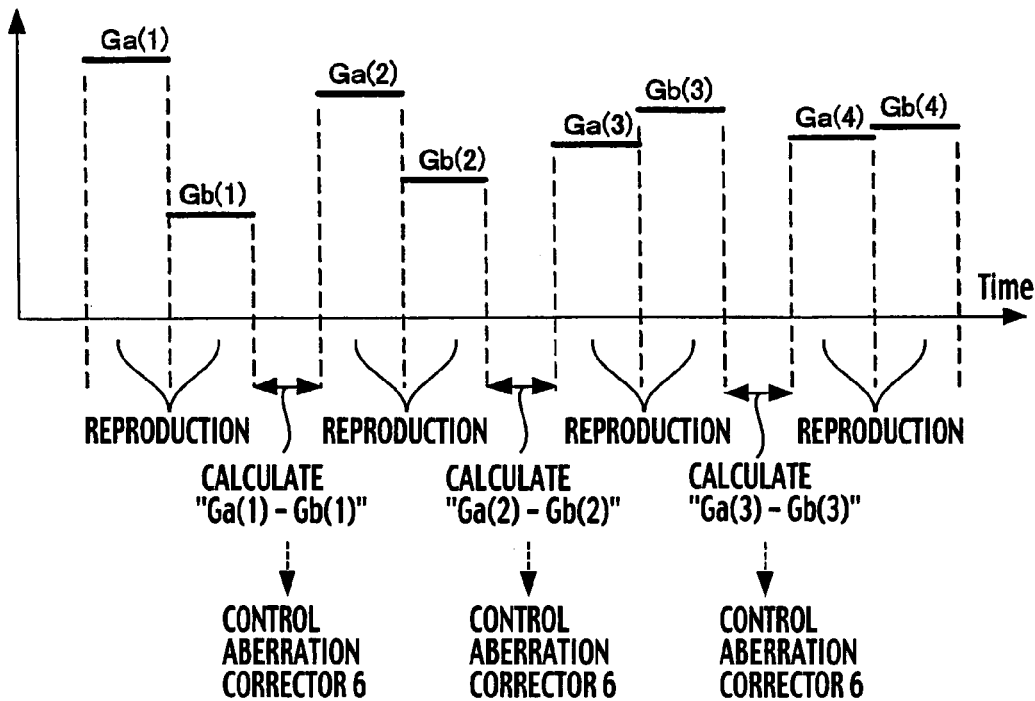
FIG. 11B is a timing chart explaining the aberration correcting method according to the first embodiment.
Figure 12:
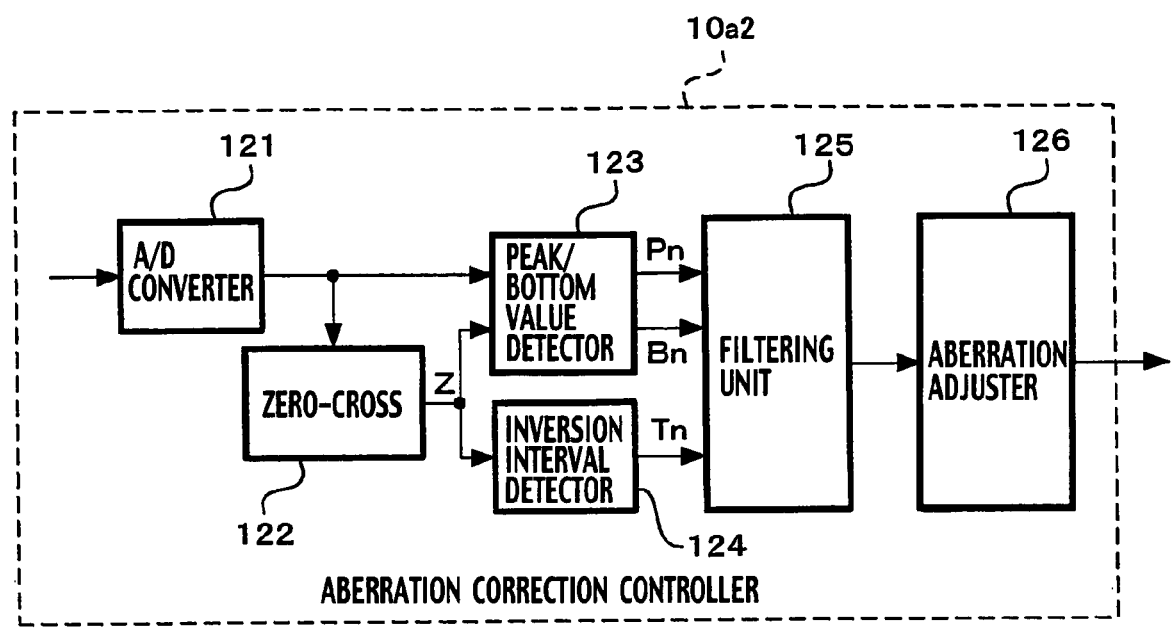
FIG. 12 is a block diagram showing the details of a configuration according to the second embodiment of the present invention.
Figure 13:
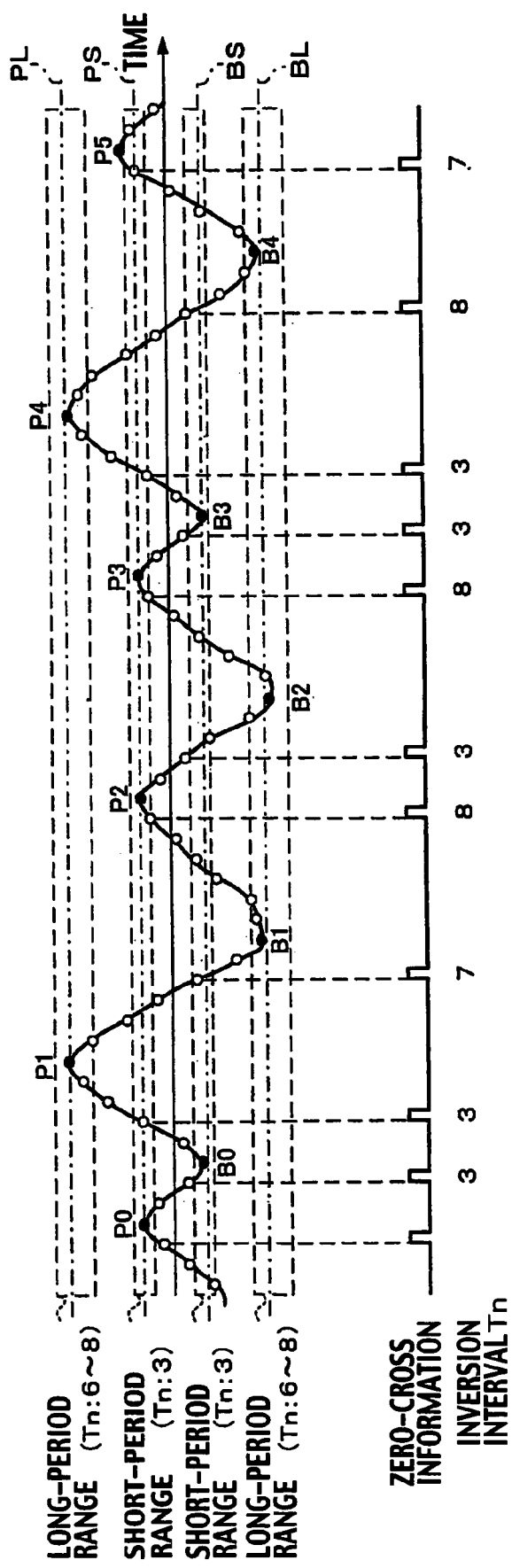
FIG. 13 is a waveform diagram explaining an aberration correcting method according to the second embodiment.
Figure 14:
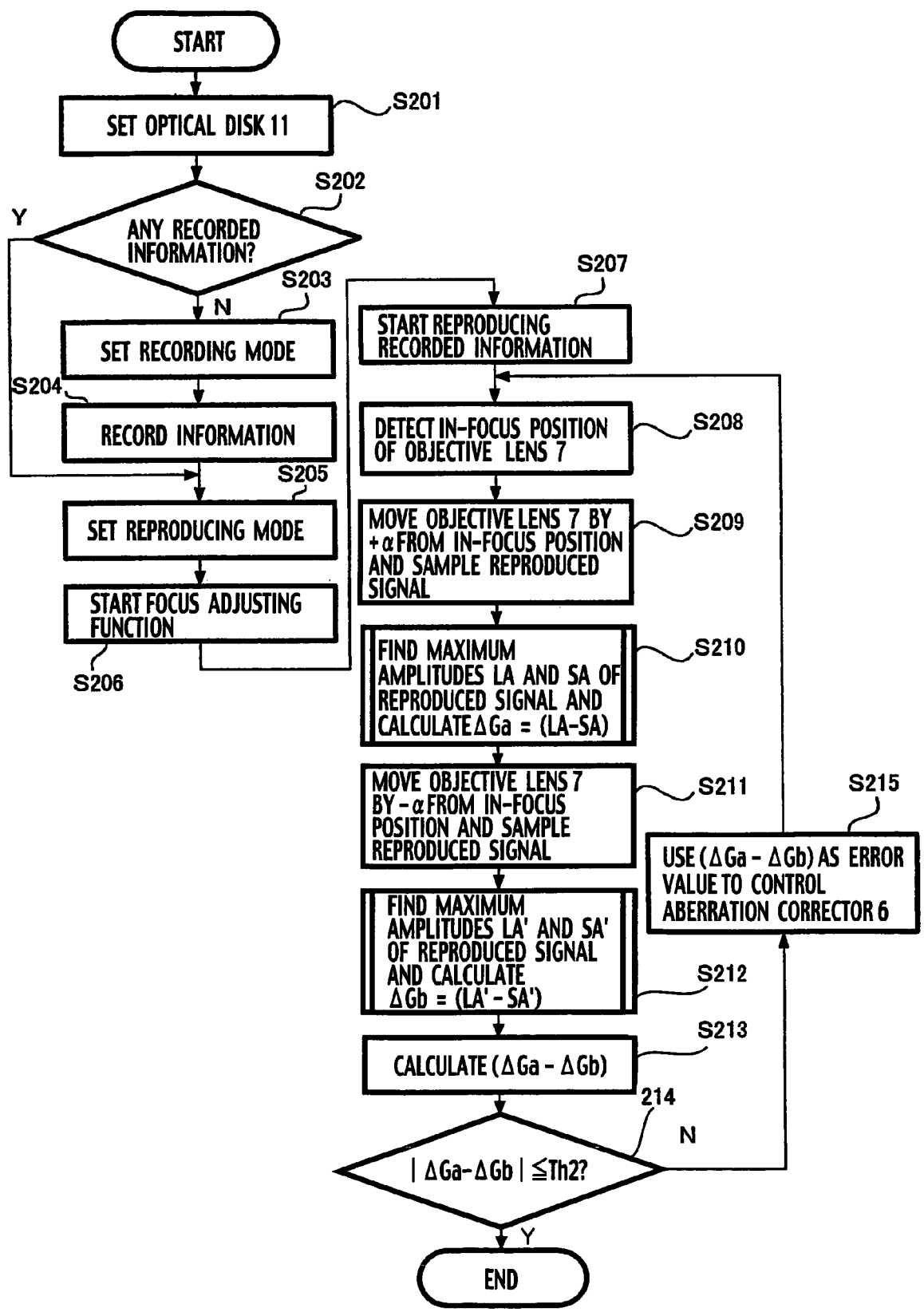
FIG. 14 is a flowchart showing the aberration correcting method according to the second embodiment.
Figure 15A:
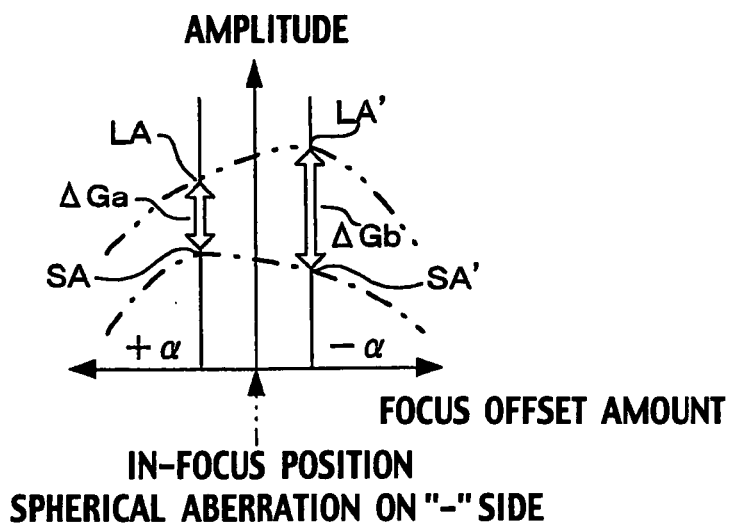
FIG. 15A is a characteristic diagram showing a state of spherical aberration according to the second embodiment.
Figure 15B:
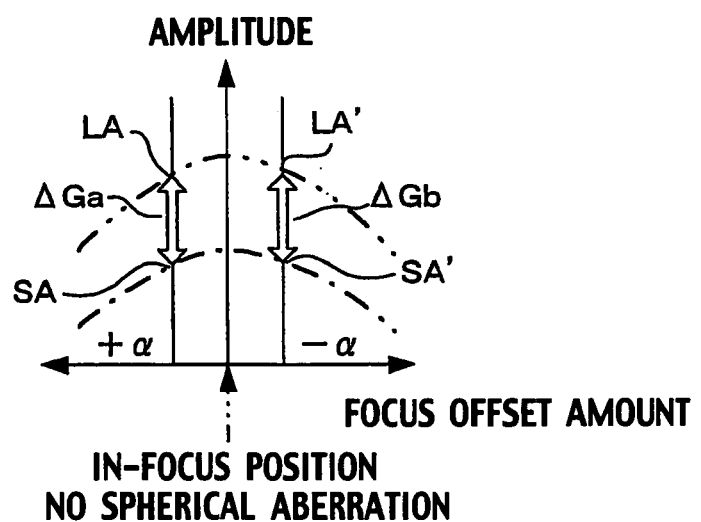
FIG. 15B is a characteristic diagram showing a state of spherical aberration according to the second embodiment.
Figure 15C:
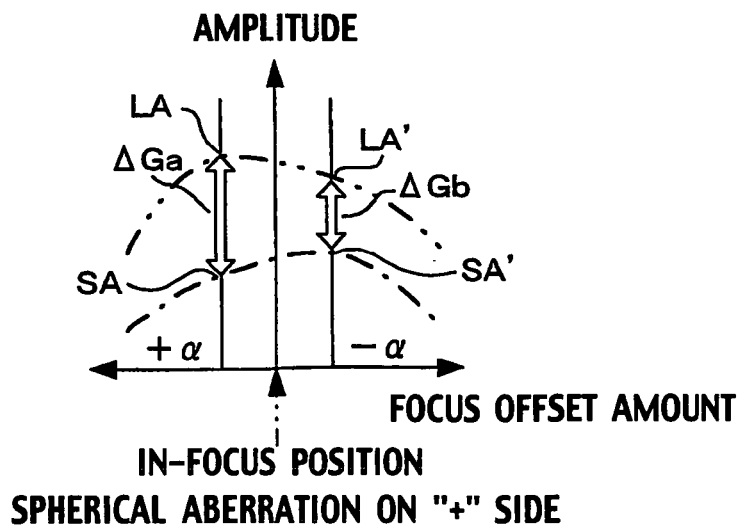
FIG. 15C is a characteristic diagram showing a state of spherical aberration according to the second embodiment.
Figure 16:
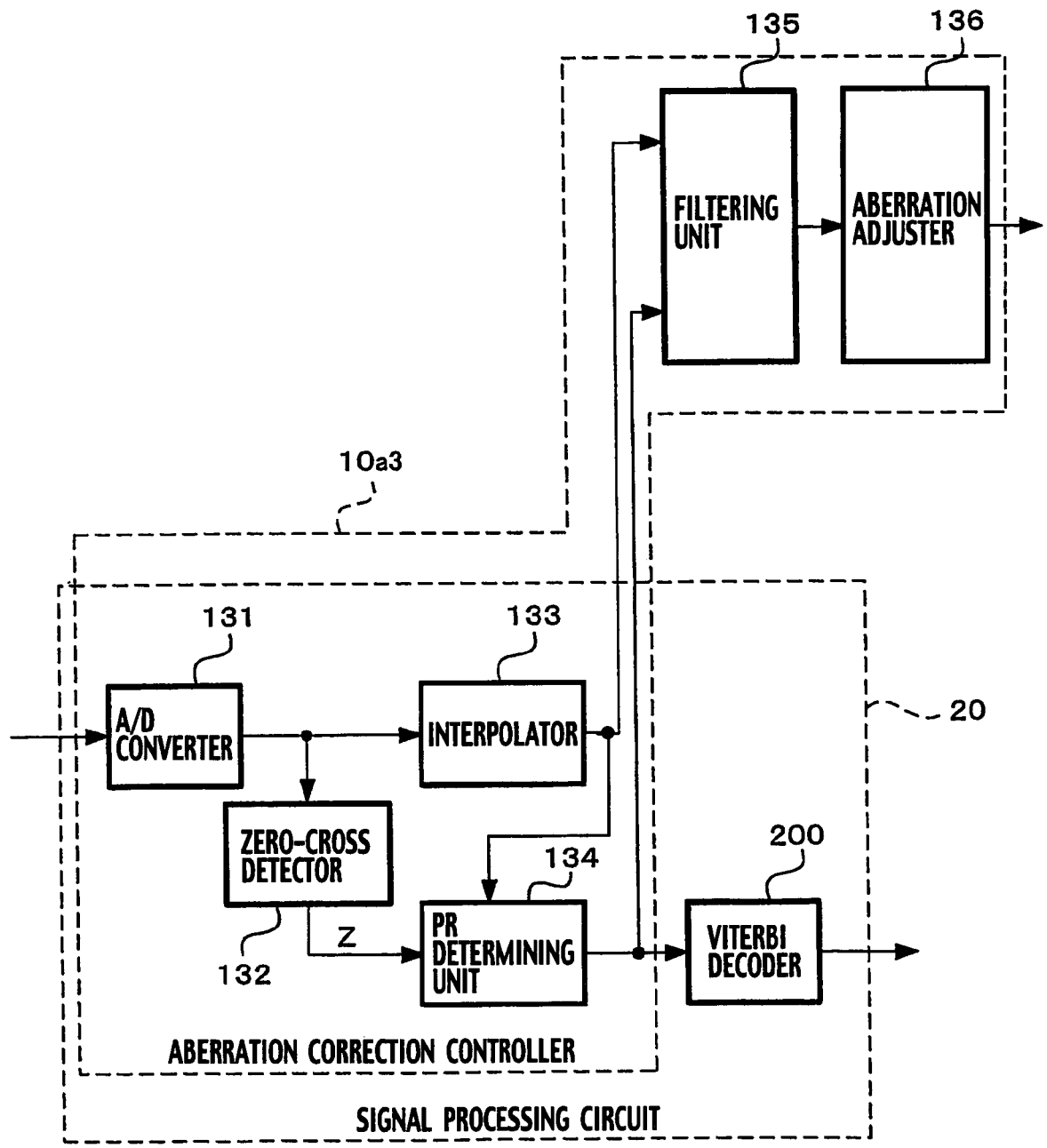
FIG. 16 is a block diagram showing the details of a configuration according to the third embodiment of the present invention.
Figure 17:
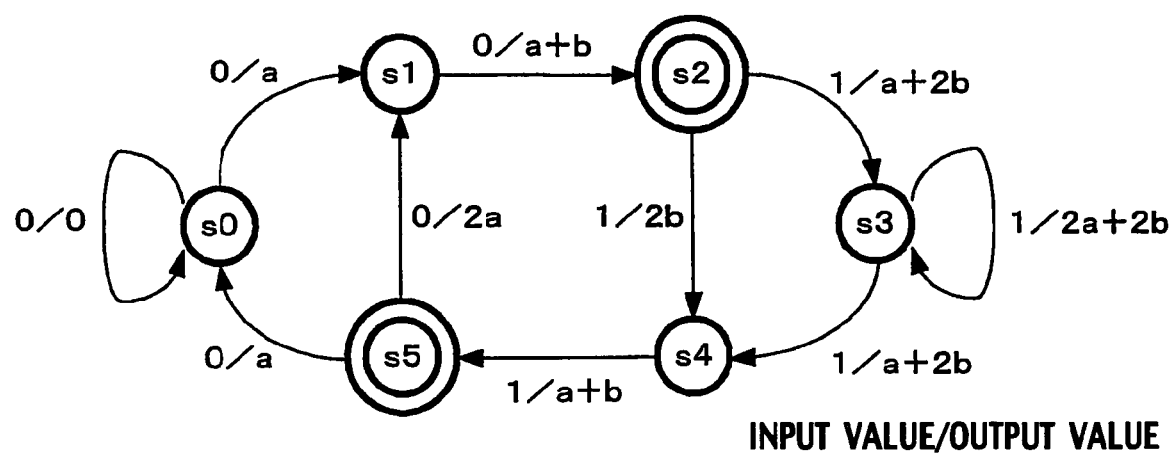
FIG. 17 is a view showing state transition based on run-length limitation and partial response characteristics.
Figure 18:
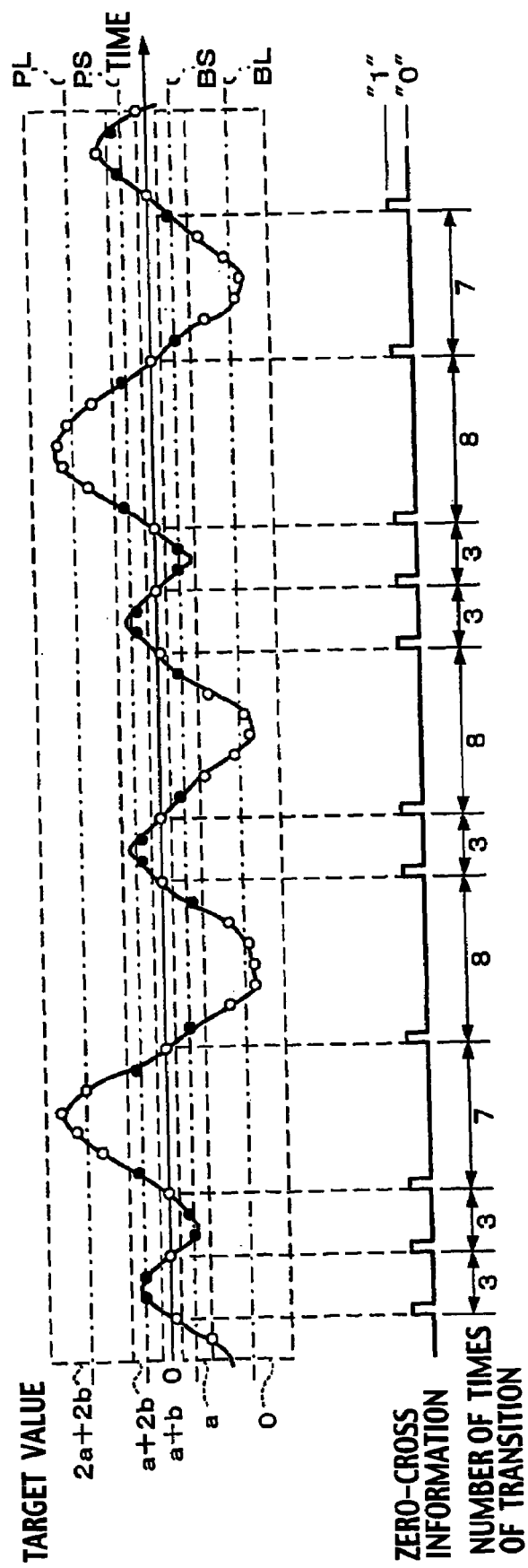
FIG. 18 is a waveform diagram explaining an aberration correcting method according to the third embodiment.
Figure 19:
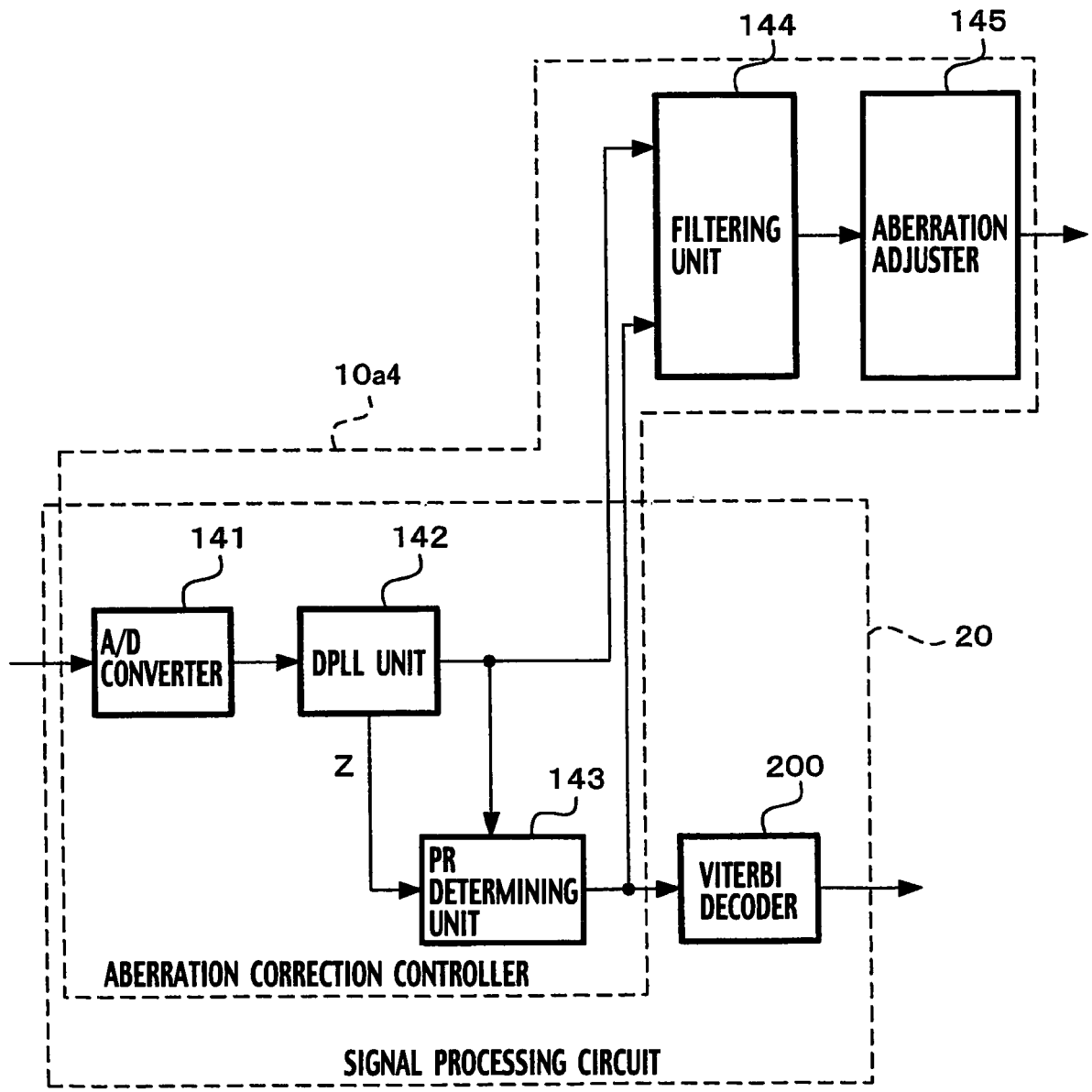
FIG. 19 is a block diagram showing the details of a configuration according to the fourth embodiment of the present invention.
Figure 20:
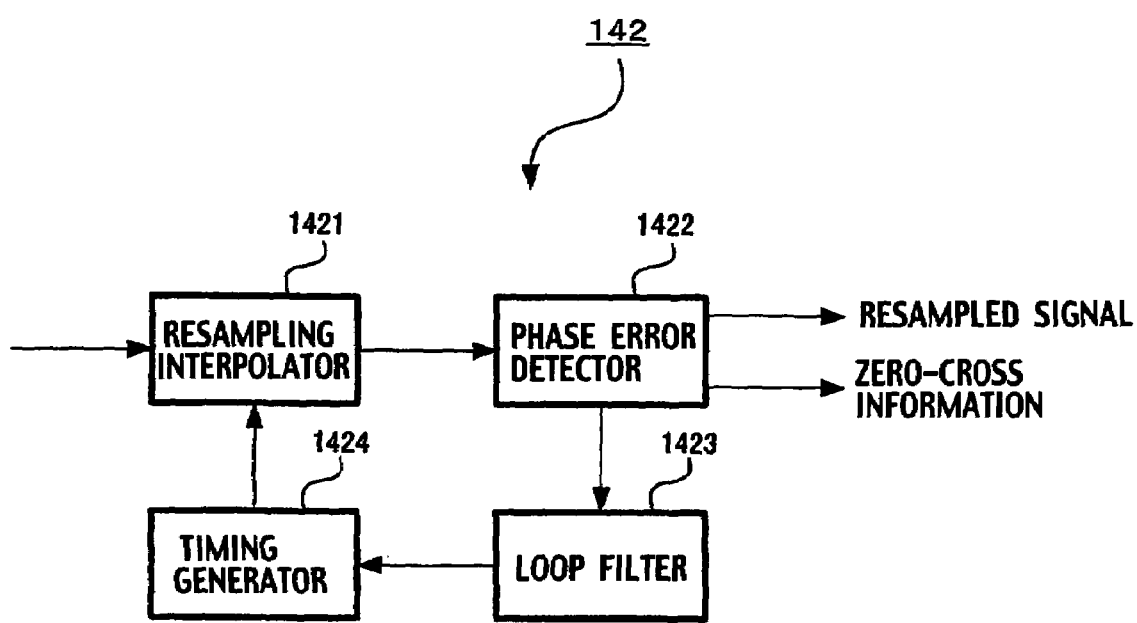
FIG. 20 is a block diagram showing a concrete example of a DPLL unit 142 of FIG. 19.
Figure 21:
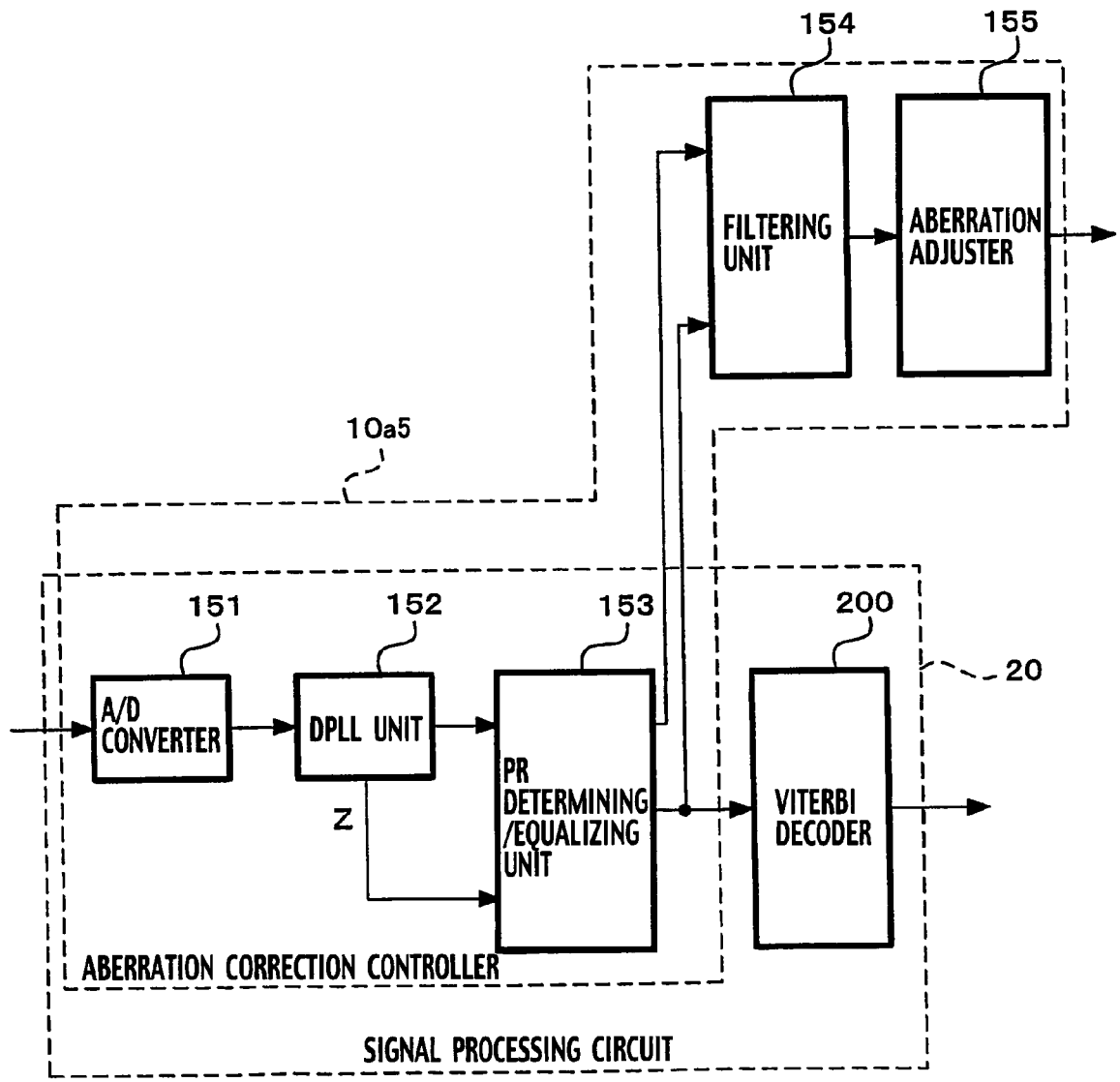
FIG. 21 is a block diagram showing the details of a configuration according to the fifth embodiment of the present invention.
Figure 22A:
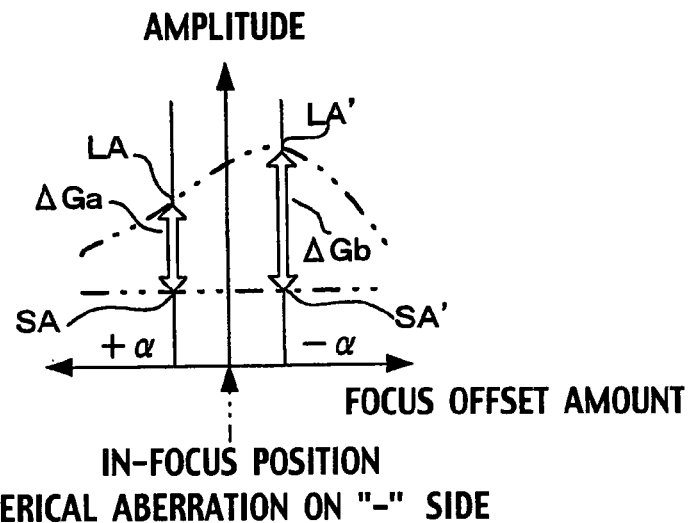
FIG. 22A is a characteristic diagram showing a state of spherical aberration according to the fifth embodiment.
Figure 22B:
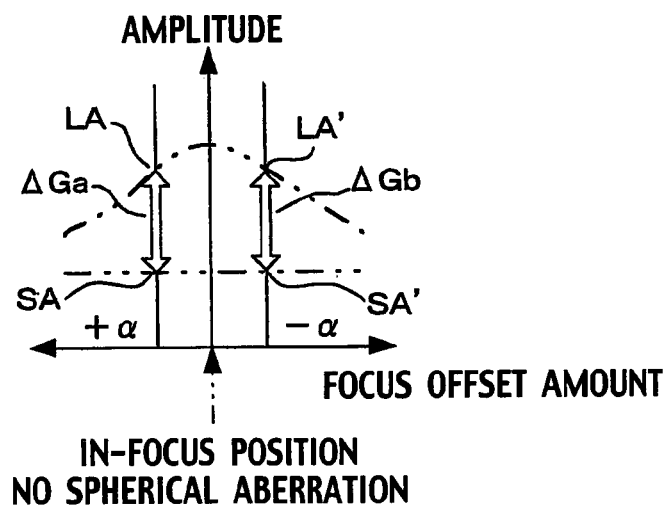
FIG. 22B is a characteristic diagram showing a state of spherical aberration according to the fifth embodiment.
Figure 22C:
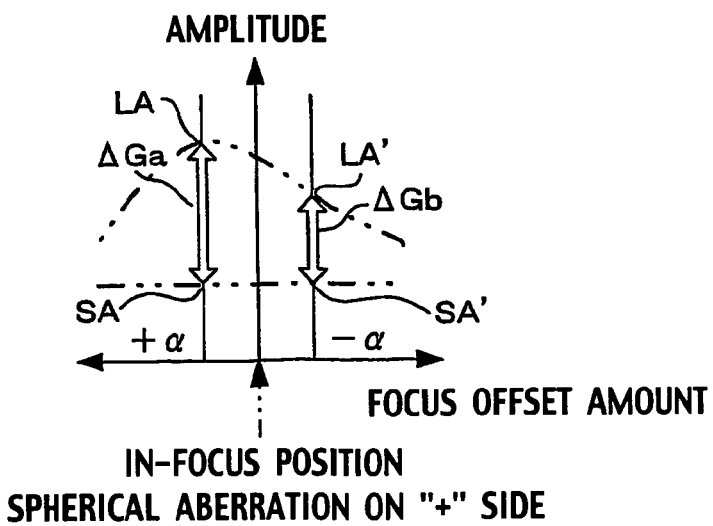
FIG. 22C is a characteristic diagram showing a state of spherical aberration according to the fifth embodiment.
Figure 23A:
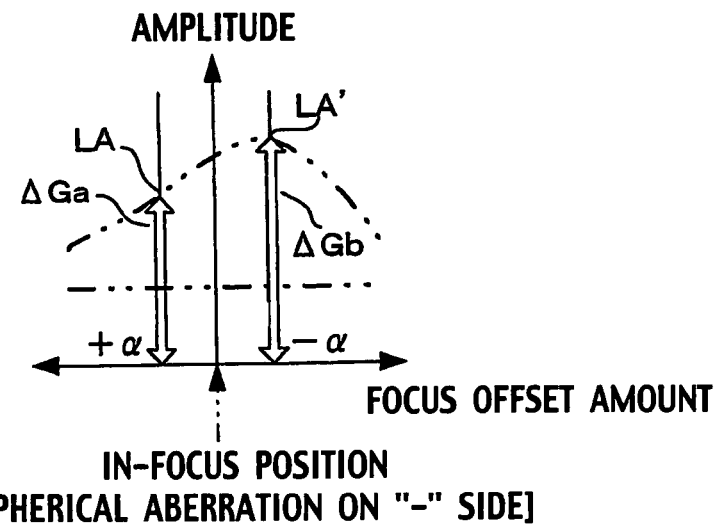
FIG. 23A is a characteristic diagram showing a state of spherical aberration according to the fifth embodiment.
Figure 23B:
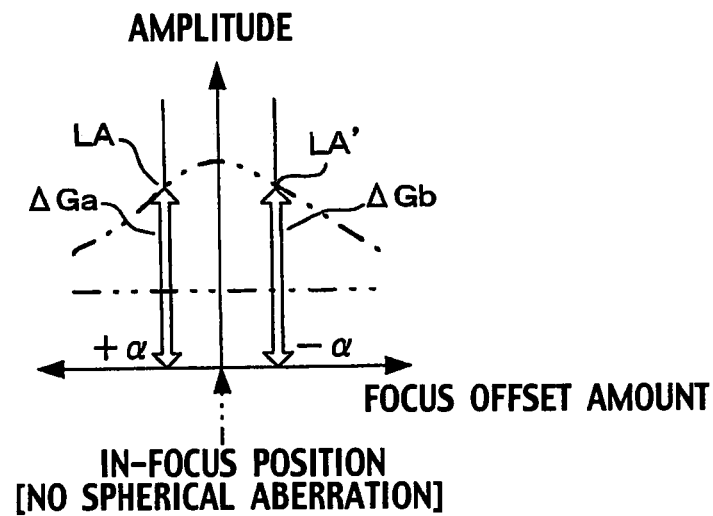
FIG. 23B is a characteristic diagram showing a state of spherical aberration according to the fifth embodiment.
Figure 23C:
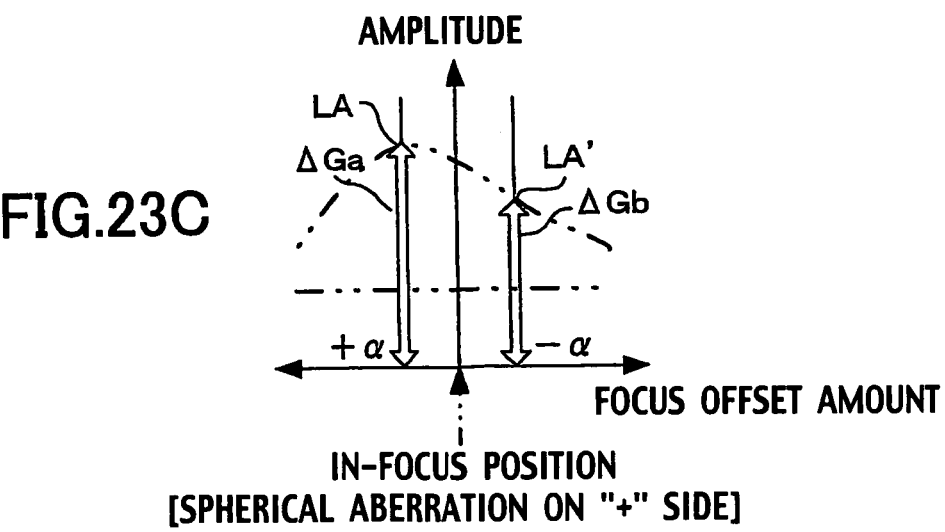
FIG. 23C is a characteristic diagram showing a state of spherical aberration according to the fifth embodiment.
Figure 24:
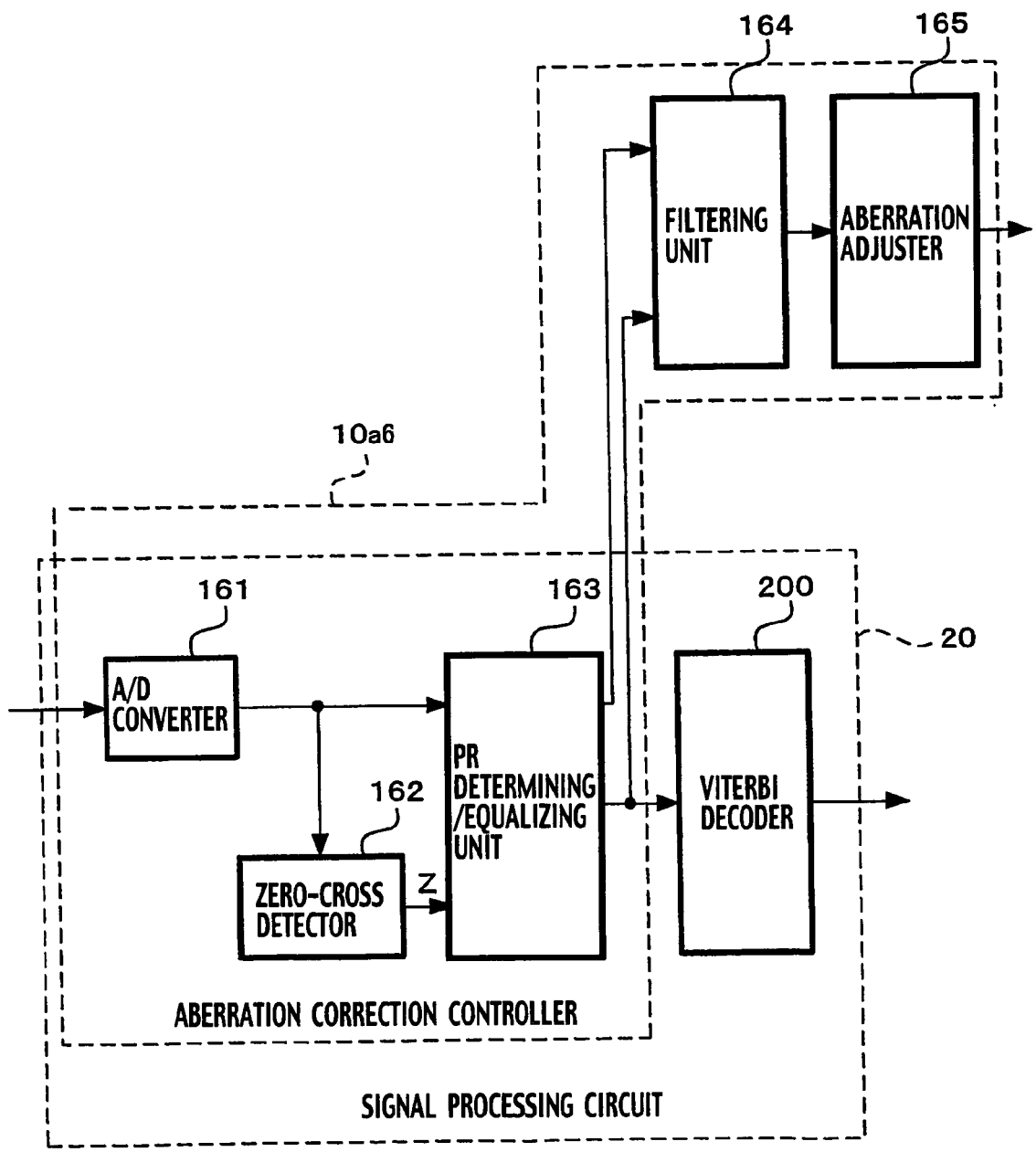
FIG. 24 is a block diagram showing the details of a configuration according to the sixth embodiment of the present invention.
Figure 25:
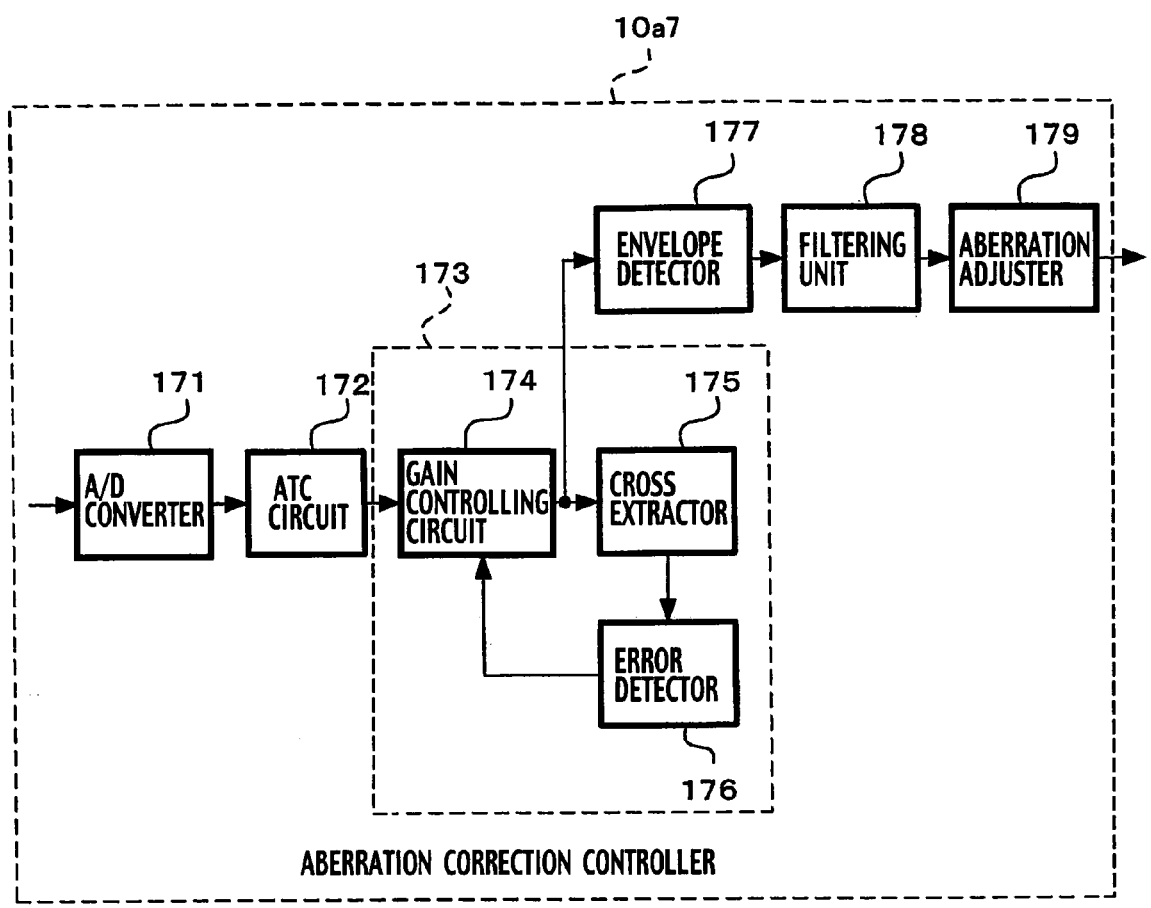
FIG. 25 is a block diagram showing the details of a configuration according to the seventh embodiment of the present invention.
Figure 26:
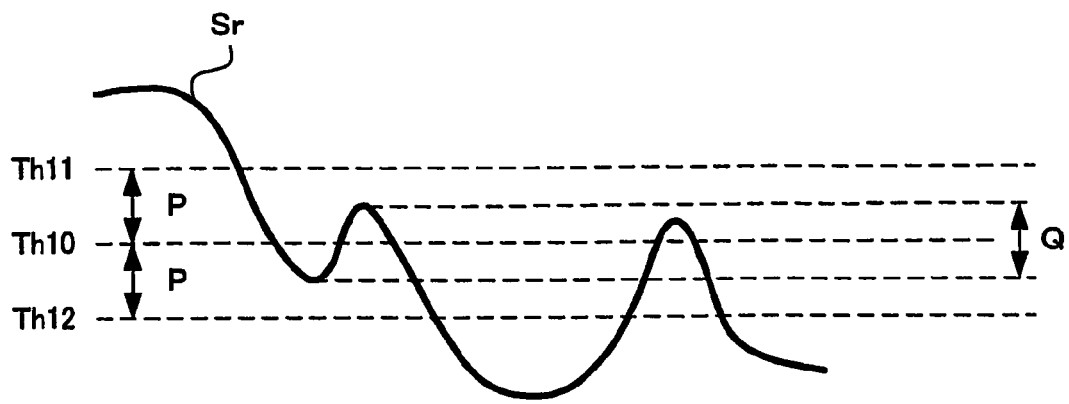
FIG. 26 is a waveform diagram explaining an aberration correcting method according to the seventh embodiment.
Figure 27:
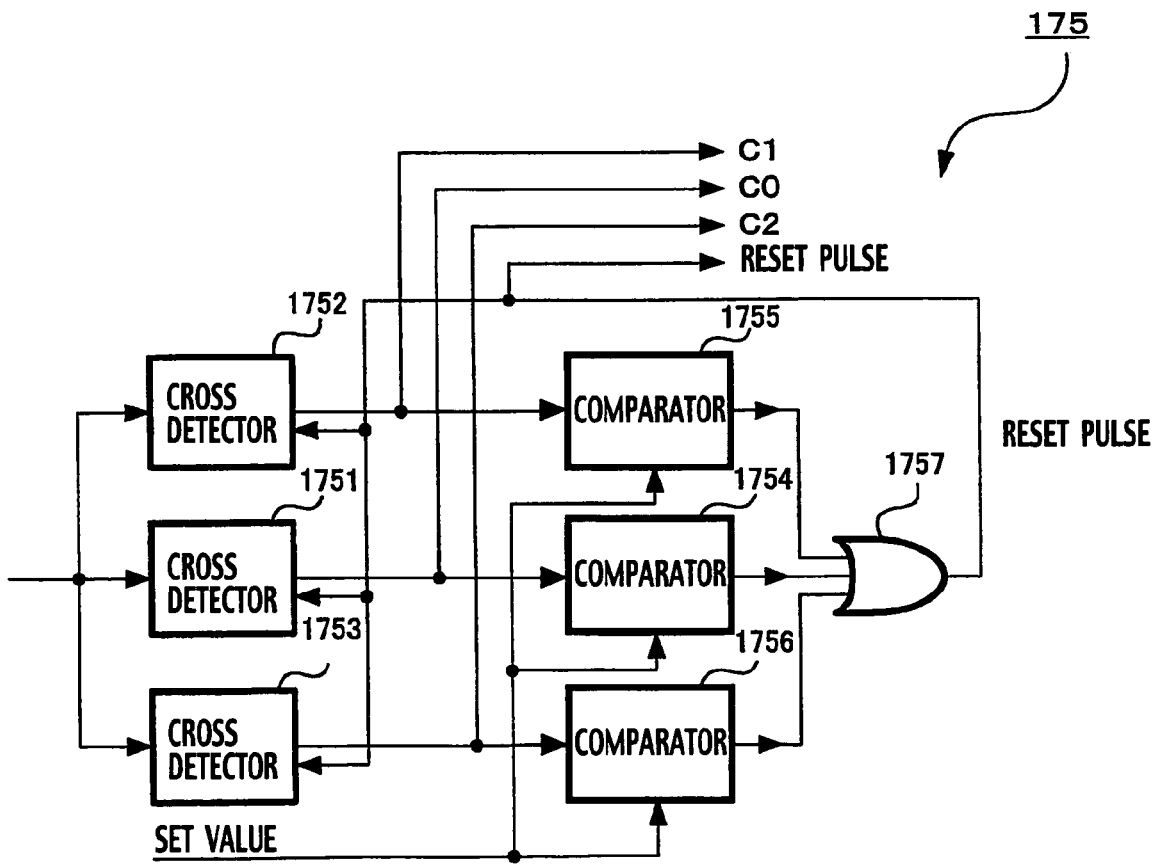
FIG. 27 is a block diagram showing a concrete example of a cross extractor 175 of FIG. 25.
Figure 28:
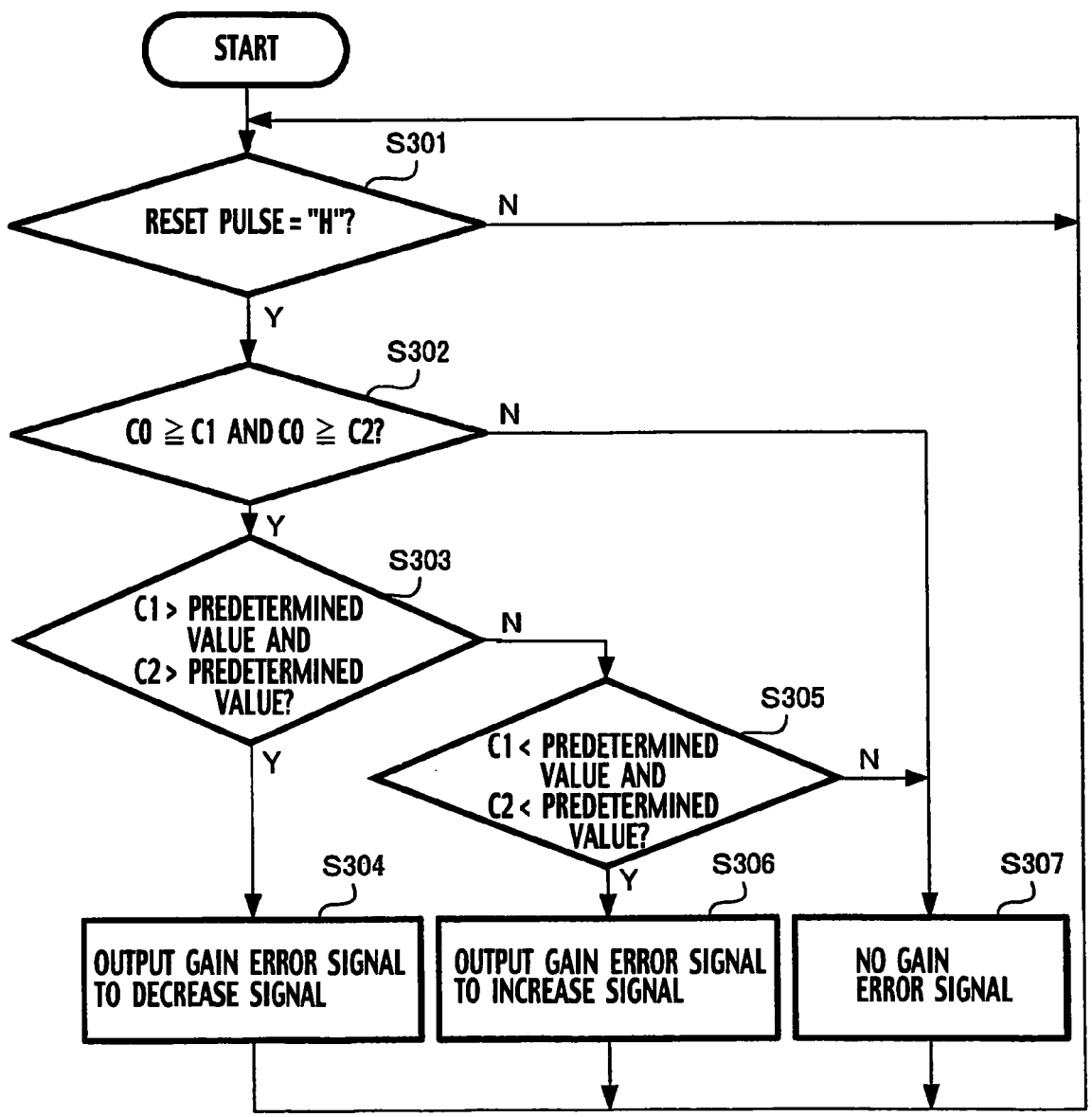
FIG. 28 is a flowchart explaining the aberration correcting method according to the seventh embodiment.
Figure 29A:
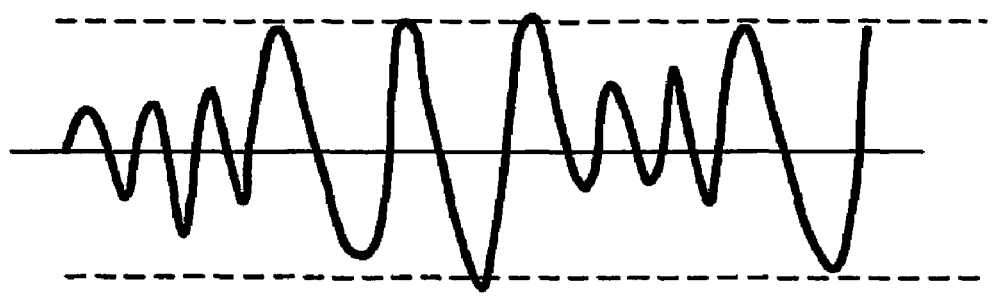
FIG. 29A is a waveform diagram explaining the aberration correcting method according to the seventh embodiment.
Figure 29B:
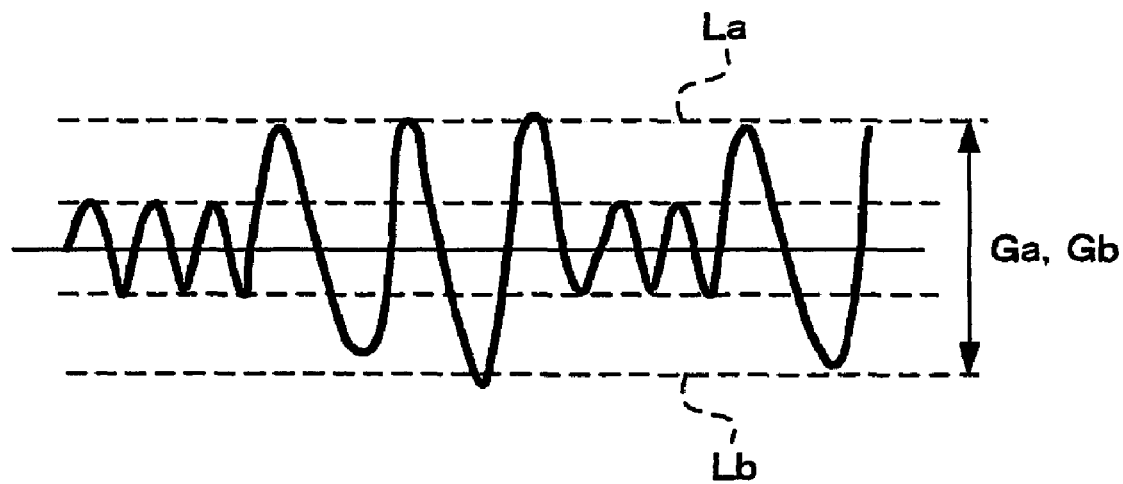
FIG. 29B is a waveform diagram explaining the aberration correcting method according to the seventh embodiment.
Figure 30:
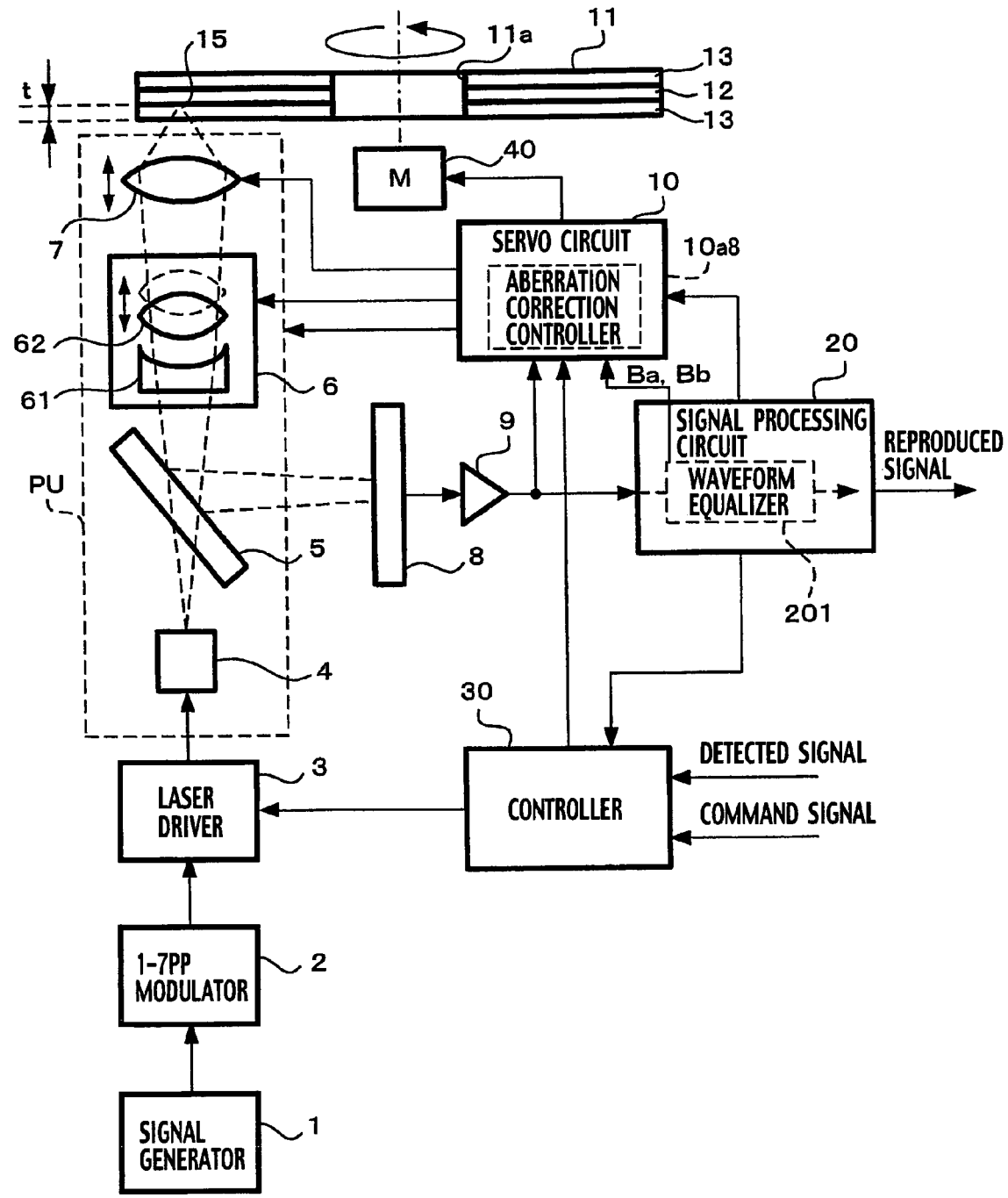
FIG. 30 is a block diagram generally showing an optical disk unit according to an eighth embodiment of the present invention.
Figure 31:
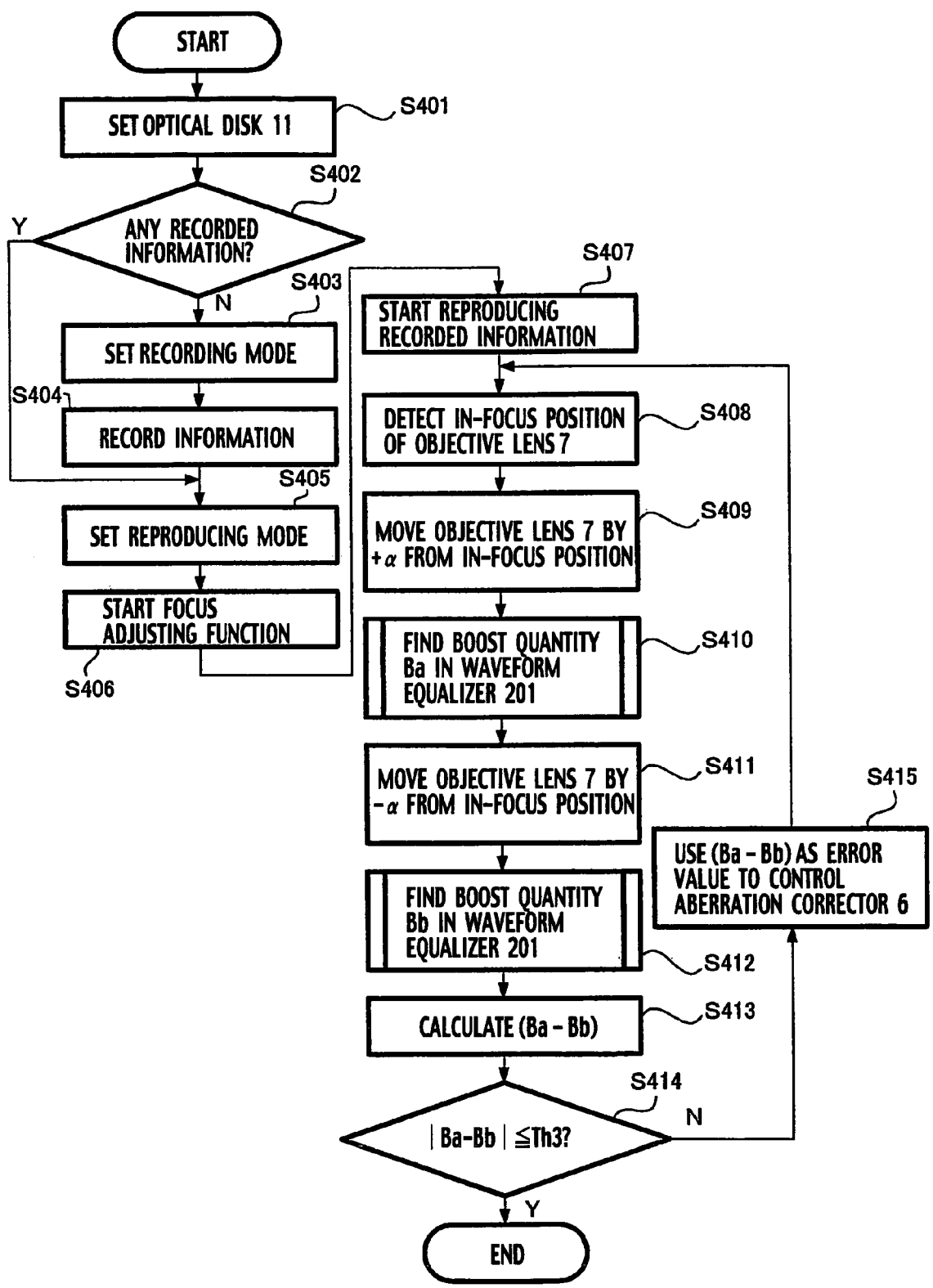
FIG. 31 is a flowchart showing an aberration correcting method according to the eighth embodiment.

Optical disk units and aberration correcting methods for the optical disk units according to the present invention will be explained with reference to the accompanying drawings. FIG. 5 is a block diagram showing a basic configuration of an optical disk unit according to the first to seventh embodiments of the present invention, FIG. 6 is a block diagram showing the details of a configuration according to the first embodiment, FIG. 7 is a plan view showing an example of an optical disk used for the optical disk unit according to the present invention, FIG. 8 is a waveform diagram showing an example of a reproduced signal according to the first embodiment, FIG. 9 is a flowchart showing an aberration correcting method according to the first embodiment, FIGS. 10A to 10C are characteristic diagrams showing states of spherical aberration according to the first embodiment, FIGS. 11A and 11B are timing charts explaining the aberration correcting method according to the first embodiment, FIG. 12 is a block diagram showing the details of a configuration according to the second embodiment of the present invention, FIG. 13 is a waveform diagram explaining an aberration correcting method according to the second embodiment, FIG. 14 is a flowchart showing the aberration correcting method according to the second embodiment, FIGS. 15A to 15C are characteristic diagrams showing states of spherical aberration according to the second embodiment, FIG. 16 is a block diagram showing the details of a configuration according to the third embodiment of the present invention, FIG. 17 is a view showing a state transition based on run-length limitation and partial response characteristics, FIG. 18 is a waveform diagram explaining an aberration correcting method according to the third embodiment, FIG. 19 is a block diagram showing the details of a configuration according to the fourth embodiment of the present invention, FIG. 20 is a block diagram showing a concrete example of a DPLL unit 142 of FIG. 19, FIG. 21 is a block diagram showing the details of a configuration according to the fifth embodiment of the present invention, FIGS. 22A to 22C are characteristic diagrams showing states of spherical aberration according to the fifth embodiment, FIGS. 23A to 23C are characteristic diagrams showing states of spherical aberration according to the fifth embodiment, FIG. 24 is a block diagram showing the details of a configuration according to the sixth embodiment of the present invention, FIG. 25 is a block diagram showing the details of a configuration according to the seventh embodiment of the present invention, FIG. 26 is a waveform diagram explaining an aberration correcting method according to the seventh embodiment, FIG. 27 is a block diagram showing a concrete example of a cross extractor 175 of FIG. 25, FIG. 28 is a flowchart explaining the aberration correcting method according to the seventh embodiment, FIGS. 29A and 29B are waveform diagrams explaining the aberration correcting method according to the seventh embodiment, FIG. 30 is a block diagram generally showing an optical disk unit according to the eighth embodiment of the present invention, FIG. 31 is a flowchart showing an aberration correcting method according to the eighth embodiment, FIGS. 32A to 32F are characteristic diagrams showing states of spherical aberration according to the eighth embodiment, and FIGS. 33A and 33B are timing charts explaining the aberration correcting method according to the eighth embodiment.

First Embodiment

In FIG. 5, a signal generator 1 generates an optional signal. The signal generator 1 may incorporate a buffer. The optional signal may be a digital signal composed of 0s and 1s, a digital signal composed of only 0s or 1s, a random signal composed of a plurality of random values, or the like. The optional signal generated by the signal generator 1 may be recording information (such as a video signal and an audio signal) to be recorded in an optical disk 11, or fixed values stored in the buffer in advance.

The optional signal provided by the signal generator 1 is modulated by, for example, a 1-7 pp modulator 2 into a random signal having a plurality of amplitudes based on normal run-length limitation. Even if receiving a digital signal composed of only 0s or 1s, the 1-7 pp modulator 2 can modulate the digital signal into a random signal. Instead of the 1-7 pp modulation, another modulation such as FMplus modulation may be employed.

According to the random signal provided by the 1-7 pp modulator 2, a laser driver 3 drives a laser beam source 4, which emits a laser beam (light beam). The laser beam emitted from the laser beam source 4 is passed through a beam splitter 5 and an aberration corrector 6 to an objective lens (condenser lens) 7. The aberration corrector 6 consists of, for example, a concave lens 61 and a convex lens 62. One or both of the concave lens 61 and convex lens 62 are freely movable along an optical axis. Changing the distance between the concave lens 61 and the convex lens 62 results in changing the diverging angle or converging angle of the laser beam made incident to the objective lens 7, to thereby correct a spherical aberration of a condensed beam spot 15.

The structure of the aberration corrector 6 is not limited to the one shown in the drawing. The aberration corrector 6 may employ a variable focus lens made of a liquid crystal element with a concentric electrode pattern formed around an optical axis. A voltage applied to the electrode pattern is changed to control the phase change of a beam transmitted through the liquid crystal element. The aberration corrector 6 may be a combination of two convex lenses, or may employ a hologram lens. The aberration corrector 6 and objective lens 7 may employ collimator lenses. The collimator lenses may be moved along an optical axis to change the diverging or converging angle of a laser beam.

The objective lens 7 condenses the laser beam made incident thereto, to form the condensed beam spot 15 on an information recording layer 12 of the optical disk 11. A reflected beam from the optical disk 11 is passed through the objective lens 7 and aberration corrector 6 to the beam splitter 5. The beam splitter 5 reflects the beam into a photodetector 8. The beam splitter is a standard beam splitter. Instead, a polarizing beam splitter and a ¼ wave plate may be employed to efficiently separate a reflected beam.

The elements from the laser beam source 4 to the objective lens 7 form an optical pickup PU. The optical pickup PU is collectively movable in a radial direction of the optical disk 11.

As is well known, the photodetector 8 has, for example, quartered photodetector elements. The photodetector 8 provides a reproduced signal, which is amplified with a high-frequency amplifier 9. The amplified signal is supplied to a servo circuit 10 and a signal processing circuit 20. On the reproduced signal from the high-frequency amplifier 9, the signal processing circuit 20 conducts various processes such as Viterbi decoding. The Viterbi decoding is a process for binarizing the reproduced signal according to a maximum likelihood decoding technique. The binarized reproduced signal is supplied to a demodulation circuit (not shown). The signal processed in the signal processing circuit 20 may be supplied to the servo circuit 10 and may be used therein. The servo circuit 10 has a focus controller 10$f$ (shown in FIG. 6) for moving the objective lens 7 along an optical axis to control the focus of the condensed beam spot 15 and an aberration correction controller 10$a$1 (shown in FIG. 6) for correcting a spherical aberration caused when the thickness t of a transparent substrate 13 of the optical disk 11 is out of an allowance.

Although not shown in detail, the servo circuit 10 conducts tracking control for precisely adjusting the optical axis of a laser beam in a radial direction, traverse control for roughly moving the optical pickup PU in a radial direction of the optical disk 11, and spindle control for controlling a spindle motor 40 that turns the optical disk 11. The focus control, tracking control, and traverse control are carried out with actuators that are not shown.

A controller 30 controls various parts of the optical disk unit, for example, the laser driver 3 and servo circuit 10. The controller 30 receives a detected signal indicating that the optical disk 11 has been mounted on a disk mounter (not shown), i.e., the optical disk 11 has been set in the optical disk unit, as well as various command signals (record, reproduce, stop, and other commands) entered through an operation unit (not shown). The controller 30 also receives the reproduced signal from the signal processing circuit 20.

With reference to FIG. 6, the details of the focus controller 10$f$ and aberration correction controller 10$a$1 will be explained. The focus controller 10$f$ has a focus detector 101 and a focus adjuster 102. The focus detector 101 receives, from the quartered photodetector elements, a differential signal between a multiplied signal of first diagonal direction and a multiplied signal of second diagonal direction, and according to the differential signal, generates a focus error signal. According to the focus error signal from the focus detector 101, the focus adjuster 102 moves the objective lens 7 along an optical axis, to focus the condensed beam spot 15 on the information recording layer 12 of the optical disk 11.

The aberration correction controller 10$a$1 has an A/D converter 111, an envelope detector 112, a filtering unit 113, and an aberration adjuster 114. The A/D converter 111 converts the reproduced signal from the high-frequency amplifier 9 into a digital signal. A sampling clock employed by the A/D converter 111 may be an autonomous fixed-frequency clock, or a clock synchronized with the bit rate of the reproduced signal through a PLL (phase locked loop) circuit. The analog signal supplied to the A/D converter 111 has information corresponding to a bit rate. The reproduced signal supplied to the A/D converter 111 is a combination of signals from the quartered photodetector elements. The envelope detector 112 detects envelopes (peak and bottom values) of the input digital signal. According to the detected envelopes, the filtering unit 113 generates a control signal for correcting a spherical aberration. According to the control signal for correcting a spherical aberration, the aberration adjuster 114 controls the aberration corrector 6 to correct a spherical aberration.

The details of operation of the envelope detector 112 and filtering unit 113 will be explained later.

Spherical aberration correction according to the first embodiment will be explained in detail. As shown in FIG. 7, the optical disk 11 has a center opening 11$a$. From an inner circumferential side toward an outer circumferential side, the optical disk 11 has a ROM area 11$b$ for beforehand storing information such as copy protection information, a lead-in area 11$c$, a recording area 11$d$ for recording actual information signals such as video and audio signals, and a lead-out area 11$e$. If the optical disk 11 is a writable or rewritable optical disk (R, RW, or RAM disk), the lead-in area 11$c$ includes an OPC (optimum power control) area. The OPC area is an area where a test write operation is conducted with a laser beam before recording information signals in the optical disk 11, to find an optimum recording power for a laser beam to write the information signals in the optical disk 11.

Referring to FIG. 9, step S101 sets the optical disk 11 on the disk mounter. Step S102 checks to see if the optical disk 11 has some recorded information. More precisely, a detected signal indicating that the optical disk 11 has been set on the disk mounter is supplied to the controller 30. Then, the controller 30 controls the laser driver 3 so that the laser beam source 4 emits a reproducing laser beam to read information from the lead-in area 11c. The information read from the lead-in area 11c tells whether or not the optical disk 11 has some recorded information. This recorded information means a random signal having a plurality of amplitudes and periods to be used for correcting a spherical aberration to be explained later.

If there is no recorded information, the controller 30 sets a recording mode in step S103. In step S104, the controller 30 controls the laser driver 3 so that the laser beam source 4 emits a recording laser beam to record information for spherical aberration correction in the optical disk 11.

The information recording operation in step S104 is preferably conducted in the OPC area of the lead-in area 11c. The information to be recorded is a random signal having a plurality of amplitudes and periods conforming to a standard run-length limited method. By recording the information in the OPC area in step S104, the recording area 11d for recording information signals (actual data) is never narrowed. The information for spherical aberration correction is recorded only in a part of the OPC area, and therefore, the information will not affect an OPC operation (optimum recording power detecting operation).

After the information for spherical aberration correction is recorded in the optical disk 11 in step S104, step S105 is carried out. Step S105 is also carried out if step S102 determines that there is recorded information. In step S105, the controller 30 sets a reproducing mode. Then, the controller 30 controls the laser driver 3 so that the laser beam source 4 emits a reproduction laser beam. In step S106, the servo circuit 10 starts a focus adjusting function. Step S107 starts reproducing the recorded information. In step S108, the servo circuit 10 detects an in-focus position of the objective lens 7.

Reproducing the recorded information in step S107 reproduces the information recorded in step S104 if step S104 has been carried out. If step S104 has been bypassed, optional information such as information recorded in the lead-in area 11c or information recorded in the recording area 11d is reproduced. If a wobbled groove has rotation control information for recording or sector address management information, such information may be reproduced. In any case, a random signal must be reproduced.

In step S109, the servo circuit 10 moves the objective lens 7 along an optical axis by +,, from the in-focus position. At this time, a reproduced signal is sampled at predetermined intervals. Moving the objective lens 7 in a "+" direction along an optical axis is to move the objective lens 7 away from the optical disk 11, or close to the optical disk 11. In step S110, the filtering unit 113 of the servo circuit 10 (aberration correction controller 10a1) finds an amplitude Ga from the reproduced signal according to envelopes detected with the envelope detector 112. Here, the amplitude Ga is substantially a maximum amplitude of the reproduced signal.

In step S111, the servo circuit 10 moves the objective lens 7 along the optical axis by −,, from the in-focus position. At this time, a reproduced signal is sampled at predetermined intervals. Moving the objective lens 7 in the "−" direction along the optical axis is to move the objective lens 7 opposite to the above-mentioned "+" direction. In step S112, the filtering unit 113 finds an amplitude Gb from the reproduced signal according to envelopes detected with the envelope detector 112. Here, the amplitude Gb is substantially a maximum amplitude of the reproduced signal. The details of the amplitudes Ga and Gb and a technique of finding them will be described in detail later.

In step S113, the filtering unit 113 finds a difference (Ga−Gb) between the maximum amplitudes of the reproduced signal found at the respective positions of the objective lens 7. Step S114 determines whether or not the absolute value |Ga−Gb| of the difference is equal to or smaller than a predetermined threshold value Th1. The threshold value Th1 is a predetermined value close to 0. If |Ga−Gb| is not equal to or smaller than the threshold value Th1, the aberration adjuster 114 uses, in step S115, (Ga−Gb) as an error value to control the aberration corrector 6. Then, the aberration corrector 6 changes the diverging or converging angle of a laser beam made incident to the objective lens 7, to correct a spherical aberration of the condensed beam spot 15. After step S115, step S108 and the steps that follow are repeated.

Figure 3A:
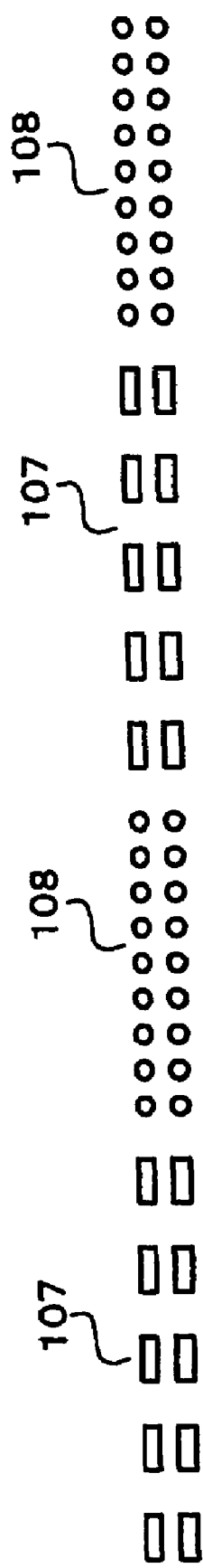
FIG. 3A is a view showing special patterns used by a related art.
Figure 3B:
FIG. 3B is a view showing a reproduced signal from the special patterns of the related art.

The details of the maximum amplitudes Ga and Gb and a technique of finding them will be explained. The reproduced signal sampled in each of steps S110 and S112 is a random signal such as one shown in FIG. 8 that involves a plurality of amplitudes and periods. Receiving such a random signal, the envelope detector 112 of FIG. 6 detects an upper envelope La (positive) and a lower envelope Lb (negative) shown in FIG. 8 and supplies them to the filtering unit 113. A signal portion containing the upper envelope La and lower envelope Lb is substantially equal to a signal reproduced from the long-period pit string 107 shown in FIG. 3B. According to the upper envelope La and lower envelope Lb, the filtering unit 113 finds the maximum amplitude Ga (Gb).

The maximum amplitude is an amplitude of a large-amplitude portion of a waveform that includes a plurality of amplitudes ranging from a small amplitude to a large amplitude. The maximum amplitude is not an instantaneous maximum amplitude within a predetermined time period.

According to the first embodiment, the maximum amplitudes Ga and Gb are each a peak-to-peak value. Only one of the upper envelope La and lower envelope Lb may be obtained and be used as a positive or negative maximum amplitude.

Figure 4A:
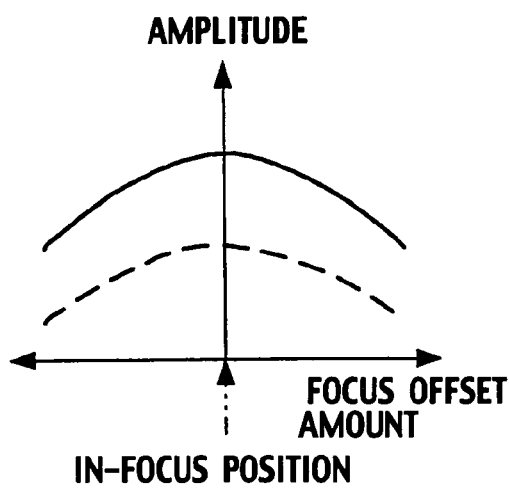
FIG. 4A is a characteristic diagram showing a state of spherical aberration according to the related art.
Figure 4B:
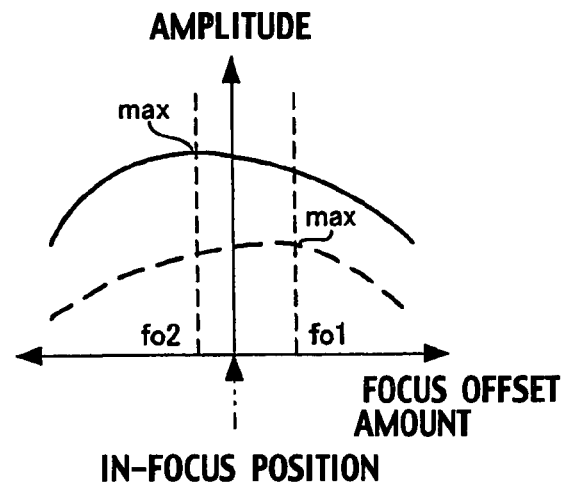
FIG. 4B is a characteristic diagram showing a state of spherical aberration according to the related art.

As explained with reference to FIG. 4B, a spherical aberration is caused if the thickness t of the transparent substrate 13 of the optical disk 11 is out of an allowance. In this case, the maximum amplitude of a reproduced signal is obtained at a position deviating from an in-focus position of the objective lens 7. This is applicable to the above-mentioned maximum amplitudes Ga and Gb. If a spherical aberration occurs, the maximum amplitudes Ga and Gb are obtained at offset positions from the in-focus position of the objective lens 7. Changes in maximum amplitudes with respect to focus offsets are as indicated with two-dots-and-dash lines in FIGS. 10A to 10C. The case of FIG. 10A occurs when a spherical aberration occurs on the "−" side. The amplitude of a reproduced signal reaches a maximum at a position in front of the in-focus position (away from the optical disk 11). The case of FIG. 10C occurs when a spherical aberration occurs on the "+" side. The amplitude of a reproduced signal reaches a maximum behind the in-focus position (close to the optical disk 11). The case of FIG. 10B occurs when no spherical aberration is present. The amplitude of a reproduced signal reaches a maximum at the in-focus position.

The related art explained with reference to FIG. 4B successively shifts the focal point of the condensed beam spot 15, finds a characteristic curve representative of amplitude changes with respect to focus offsets, and calculates a maximum amplitude on the characteristic curve. On the other hand, the first embodiment finds two maximum amplitudes Ga and Gb on any one of the characteristic curves indicated with the two-dots-and-dash lines in FIGS. 10A to 10C.

The sign of the difference (Ga–Gb) between the maximum amplitudes Ga and Gb indicates whether a spherical aberration is present on the "+" side or on the "–" side. The absolute value |Ga–Gb| of the difference determines a control quantity for correcting the aberration. Accordingly, the threshold value Th1 in step S114 of FIG. 9 is set as a threshold value corresponding to the absolute value |Ga–Gb| that establishes the state of FIG. 10B with a spherical aberration being within an allowance. As explained with reference to FIG. 9, if |Ga–Gb|>Th1, the aberration correction controller 10a1 controls the aberration corrector 6 with (Ga–Gb) as an error value. Controlling the aberration corrector 6 results in shifting the focal point of the condensed beam spot 15, and therefore, the spherical aberration does not fall within the allowance at once. Accordingly, steps S108 to S115 are repeated until |Ga–Gb|≦Th1 is established in step S114.

The procedure mentioned above is shown in timing charts of FIGS. 11A and 11B. FIG. 11A shows positional changes of the objective lens 7 and FIG. 11B shows changes in the maximum amplitudes Ga and Gb of reproduced signals as a result of the repetitive control. In FIG. 11B, a numeral between parentheses in each of Ga(1), Ga(2), Ga(3), . . . , and Gb(1), Gb(2), Gb(3), . . . is an ordinal number indicating the detection of maximum amplitudes Ga and Gb in steps S110 and S112 of FIG. 9. As is apparent in FIG. 11B, the repetitive control of spherical aberration correction carried out in the aberration correction controller 10a1 can converge the absolute value |Ga–Gb| to nearly 0.

If the transparent substrate 13 of the optical disk 11 has a constant refractive index, a table may be prepared for correction quantities applied to the aberration corrector 6 with respect to error values (Ga–Gb). With the use of the table, optimum correction may be accomplished in one time of control. This technique is useful to quickly accomplish aberration correction. In addition to the aberration correction, a focus offset of the objective lens 7 may be corrected and optimized, to provide a more ideal condensed beam spot 15. In this case, the aberration correction and focus offset correction may be alternately repeated to optimize them, or may be simultaneously achieved to optimize them.

The above-mentioned first embodiment reproduces a random signal having a plurality of amplitudes and periods, extracts a specific portion having a specific amplitude or period from the reproduced random signal, and detects an amplitude Ga (Gb). The specific portion according to the first embodiment is a portion having envelopes detected by the envelope detector 112 and including an amplitude greater than a predetermined amplitude. This portion substantially contains a maximum amplitude. Instead of detecting a maximum amplitude of a reproduced random signal, it is possible to detect a maximum amplitude of an interpolated signal obtained by interpolating the reproduced random signal.

The first embodiment is capable of carrying out aberration correction without regard to the conditions of the optical disk 11. Only by obtaining maximum amplitudes from reproduced signals with the objective lens 7 being equally moved by „ before and after the in-focus position thereof, the first embodiment can obtain control data for the aberration corrector 6. Compared with the aberration correction method of the Patent Document 1, the first embodiment can more quickly accomplish aberration correction.

Second Embodiment

The second embodiment of the present invention basically employs the same structure as the first embodiment explained with reference to FIG. 5. An aberration correction controller of the second embodiment arranged in the servo circuit 10 is different from that shown in FIG. 6. Like the first embodiment, the second embodiment reproduces a random signal recorded in the optical disk 11 and corrects an aberration.

FIG. 12 shows the aberration correction controller 10a2 according to the second embodiment. As shown in FIG. 12, the aberration correction controller 10a2 has an A/D converter 121, a zero-cross detector 122, a peak/bottom value detector 123, an inversion interval detector 124, a filtering unit 125, and an aberration adjuster 126. The A/D converter 121 converts a reproduced signal from the high-frequency amplifier 9 into a digital signal. The digital signal provided by the A/D converter 121 is supplied to the zero-cross detector 122 and peak/bottom value detector 123. The components from the zero-cross detector 122 to the filtering unit 125 generate an error value to control the aberration corrector 6 according to a procedure mentioned below and correct a spherical aberration.

FIG. 14 shows the aberration correcting procedure according to the second embodiment. Steps S201 to S209 and S211 of FIG. 14 are the same as steps S101 to S109 and S111 of FIG. 9, and therefore, the explanation of these common parts will be partly omitted and steps from step S207 will be explained. In FIG. 14, step S207 starts to reproduce recorded information. In step S208, the servo circuit 10 detects an in-focus position of the objective lens 7. In step S209, the servo circuit 10 moves the objective lens 7 along an optical axis by "+" from the in-focus position. At this time, a reproduced signal is sampled at predetermined intervals. In step S210, the components from the zero-cross detector 122 to the filtering unit 125 in the servo circuit 10 (aberration correction controller 10a2) find maximum amplitudes LA and SA and compute „Ga=(LA–SA).

In step S211, the servo circuit 10 moves the objective lens 7 along the optical axis by –„ from the in-focus position. At this time, a reproduced signal is sampled at predetermined intervals. In step S212, the components from the zero-cross detector 122 to the filtering unit 125 find maximum amplitudes LA' and SA' and compute „Gb=(LA'–SA'). The details of the maximum amplitudes LA, SA, LA', and SA' and a technique of finding them will be explained later.

In step S213, the filtering unit 125 finds a difference („Ga–„Gb) of the reproduced signals at the respective positions of the objective lens 7, and in step S214, determines whether or not the absolute value |„Ga–„Gb| of the difference is equal to or smaller than a predetermined threshold value Th2. The threshold value Th2 is a value close to 0. If |„Ga–„Gb| is not equal to or smaller than the threshold value Th2, the aberration adjuster 126 controls, in step S215, the aberration corrector 6 with („Ga–„Gb) as an error value, to change the diverging or converging angle of a laser beam made incident to the objective lens 7 and correct a spherical aberration of the condensed beam spot 15. After step S215, the steps from step S208 are repeated.

The details of the maximum amplitudes LA, SA, LA', and SA' and the differences „Ga and „Gb and a technique for obtaining them will be explained. FIG. 13 shows an example of a digital signal provided by the A/D converter 121. White and black dots indicate sampling points. The reproduced signal in each of steps S210 and S212 is a random signal having a plurality of amplitudes and periods as shown in FIG. 13.

The zero-cross detector 122 has a zero level having a predetermined threshold level. The zero-cross detector 122 finds a difference between the input reproduced signal and the zero level, and whenever the polarity of the difference is inverted, detects the time point as a zero-cross point. As shown in FIG. 13, the zero-cross points detected by the zero-cross detector 122 are provided as zero-cross information Z.

The zero-cross information Z is expressed with an expression (1) mentioned below. The zero-cross information Z shows the timing of each zero-cross point. The polarities of sampling points before and after a zero-cross point provide a positive or negative inclination of the reproduced signal.

$$Z=\text{Pole}(Sn-1)\Lambda\text{Pole}(Sn) \quad (1)$$

where Sn is a signal level at a sampling point, $\Lambda$ is an EX-OR operation, and Pole is a polarity represented with 0 or 1.

The zero-cross information Z is supplied to the peak/bottom value detector 123 and inversion interval detector 124.

The peak/bottom value detector 123 detects a peak value Pn or a bottom value Bn of the reproduced signal at an intermediate position between two zero-cross points. A numeral "n" of the peak value Pn and bottom value Bn is an integer that is incremented by one whenever two zero-cross points are obtained. At the sampling points indicated with black circles in FIG. 13, there are peak values P0, P1, P2, P3, . . . and bottom values B0, B1, B2, B3, . . . .

The inversion interval detector 124 detects an inversion interval Tn corresponding to a time interval between two zero-cross points. Namely, the inversion interval detector 124 counts the number of clocks from a time point when certain zero-cross information Z is input and detects, as an inversion interval Tn, a counted value when the next zero-cross information is input. The peak values Pn and bottom values Bn detected by the peak/bottom value detector 123 and the inversion intervals Tn detected by the inversion interval detector 124 are supplied to the filtering unit 125.

The peak values Pn and bottom values Bn may be found with the use of a hill-climbing method. For each inversion interval Tn of a sampling signal, the below-mentioned expression (2) is used to calculate M and provide a maximum value or a minimum value. If a peak value Pn−1 has been calculated in the preceding inversion interval, the minimum value is selected as a bottom value Bn. If a bottom value Bn−1 has been calculated in the preceding inversion interval, the maximum value is selected as a peak value Pn.

$$M=\text{MAX}(Sn-1, Sn), \text{ or } M=\text{MIN}(Sn-1, Sn) \quad (2)$$

where Sn is a signal level at a sampling point, MAX is to select a larger one of two arguments Sn−1 and Sn, and MIN is to select a smaller one of two arguments Sn−1 and Sn.

The filtering unit 125 has a table for classifying the inversion intervals Tn into long- and short-period groups. Whenever the inversion interval detector 124 provides an inversion interval Tn, the filtering unit 125 refers to the table, determines whether the inversion interval Tn is of a long period or of a short period, and stores a peak value Pn or a bottom value Bn in a long period area or a short period area of a memory (not shown).

For a given time period of the reproduced signal, representative values (for example, average values) are found for the peak values Pn and bottom values Bn of each of the long- and short-period groups. Then, for each of the long- and short-period groups, a difference between the representative value of the peak values Pn and the representative value of the bottom values Bn is calculated. Consequently, the filtering unit 125 provides the amplitude LA representative of a long-period reproduced signal and the short-period amplitude SA representative of a short-period reproduced signal.

According to the example shown in FIG. 13, the long-period reproduced signal is a signal having an inversion interval Tn of from 6 to 8, and the short-period reproduced signal is a signal having an inversion interval Tn of 3. The reproduced signal is a random signal having a plurality of amplitudes and periods that are mixed. The signal of the example includes inversion intervals Tn in the range from 3 to 8 with 8 being a maximum. The long-period reproduced signal may be that having an inversion interval Tn of 8. However, the probability of occurrence of a signal having an inversion interval Tn=8 is not so high, and therefore, it is preferable to define the long-period reproduced signal as a signal having an inversion interval Tn in the range of 6 to 8. On the other hand, it is preferable to limit the short-period reproduced signal to a signal having an inversion interval Tn of 3. As a result, the second embodiment extracts a signal portion having an inversion interval equal to or greater than a predetermined value as a long-period reproduced signal and a signal portion having an inversion interval smaller than the predetermined value as a short-period reproduced signal.

According to the example of FIG. 13, peak values P1, P4, . . . of the long-period reproduced signal (Tn of from 6 to 8) provide a representative value (average value) PL, bottom values B1, B2, B4, . . . thereof provide a representative value (average value) BL, peak values P0, P2, P3, P5, . . . of the short-period reproduced signal (Tn of 3) provide a representative value (average value) PS, and bottom values B0, B3, . . . thereof provide a representative value (average value) BS.

The filtering unit 125 finds the amplitude LA of the long-period reproduced signal and the amplitude SA of the short-period reproduced signal according to the expressions (3) and (4):

$$LA=PL-BL \quad (3)$$

$$SA=PS-BS \quad (4)$$

The second embodiment finds both the peak values Pn and bottom values Bn and obtains the long-period amplitude LA and the short-period amplitude SA as peak-to-peak values. It is possible to obtain the peak values Pn or the bottom values Bn and employ the peak values Pn or the bottom values Bn as amplitudes. In this case, LA=PL and SA=PS, or LA=−BL and SA=−BS.

Employing both the peak values Pn and bottom values Bn is advantageous when accurately detecting the amplitude LA of a long-period reproduced signal and the amplitude SA of a short-period reproduced signal because the peak values are free from the influence of asymmetry when the reproduced signals are asymmetrical in positive and negative directions. Employing only the peak values Pn or the bottom values Bn is advantageous in simplifying an analytical procedure.

Thereafter, the filtering unit 125 finds the difference „Ga=(LA−SA) between the long-period amplitude LA and the short-period amplitude SA. The difference „Ga is obtained in step S210 of FIG. 14 when the objective lens 7 is moved along the optical axis by +„ from the in-focus position. Similarly, step S211 moves the objective lens 7 along the optical axis by −„ from the in-focus position, and step S212 obtains a long-period amplitude LA' and a short-period amplitude SA' and calculates the difference „Gb=(LA'−SA') between the long-period amplitude LA' and the short-period amplitude SA'.

As explained with reference to FIG. 4B, a spherical aberration occurs if the thickness t of the transparent substrate 13 of the optical disk 11 is out of an allowance. In this case, the maximum amplitude of a reproduced signal appears at a position offset from the in-focus position of the objective lens 7. This is applicable to the maximum amplitude of a long-period reproduced signal and the maximum amplitude of a short-period reproduced signal according to the second embodiment. If there is a spherical aberration, the maximum amplitude of a reproduced signal deviates from the in-focus position of the objective lens 7. A two-dot-and-dash line in each of FIGS. 15A to 15C represents changes in the long-period maximum amplitude relative to focus offsets. A dot-and-dash line in each of FIGS. 15A to 15C represents changes in the short-period maximum amplitude relative to focus offsets.

FIG. 15A shows a case with a spherical aberration occurring on the negative (−) side. A maximum value appears before the in-focus position (away from the optical disk 11). FIG. 15C shows a case with a spherical aberration occurring on the positive (+) side. A maximum value appears after the in-focus position (close to the optical disk 11). FIG. 15B shows a case without a spherical aberration. A maximum value appears at the in-focus position.

Figure 1:
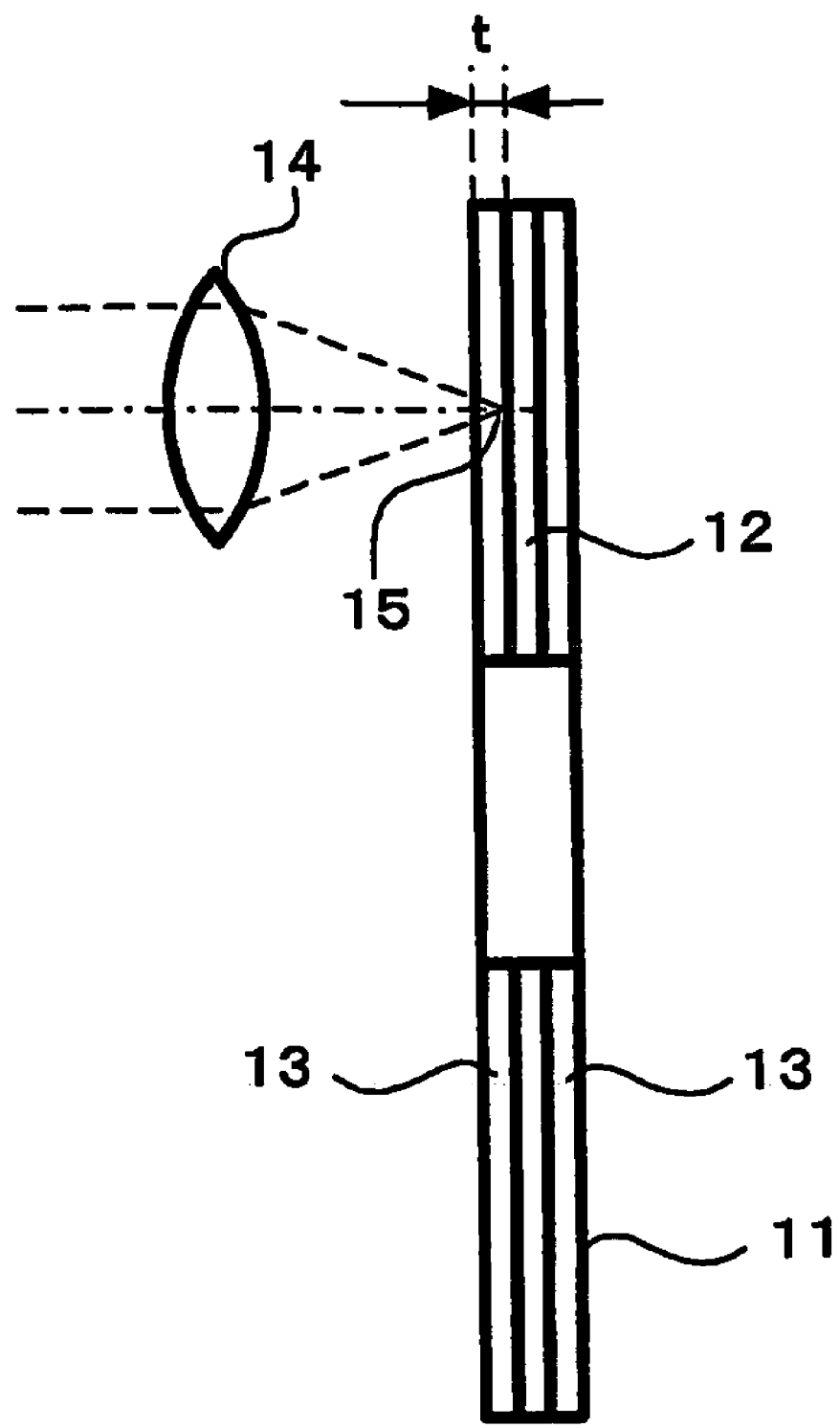
FIG. 1 is a sectional view showing an optical disk and an objective lens for forming a condensed beam spot.
Figure 2A:
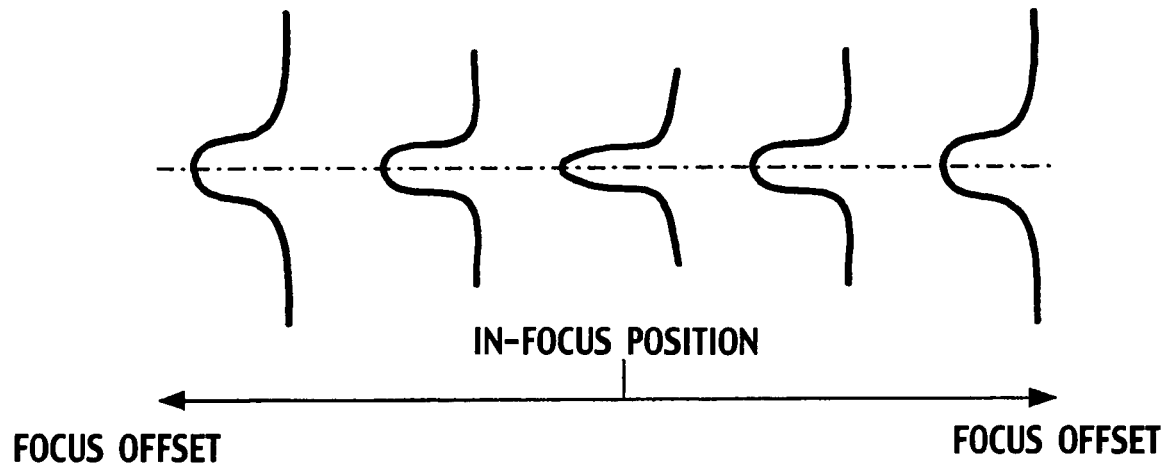
FIG. 2A is a view showing changes in light intensity distribution around an optical axis of a condensed beam spot with respect to focus offsets.
Figure 2B:
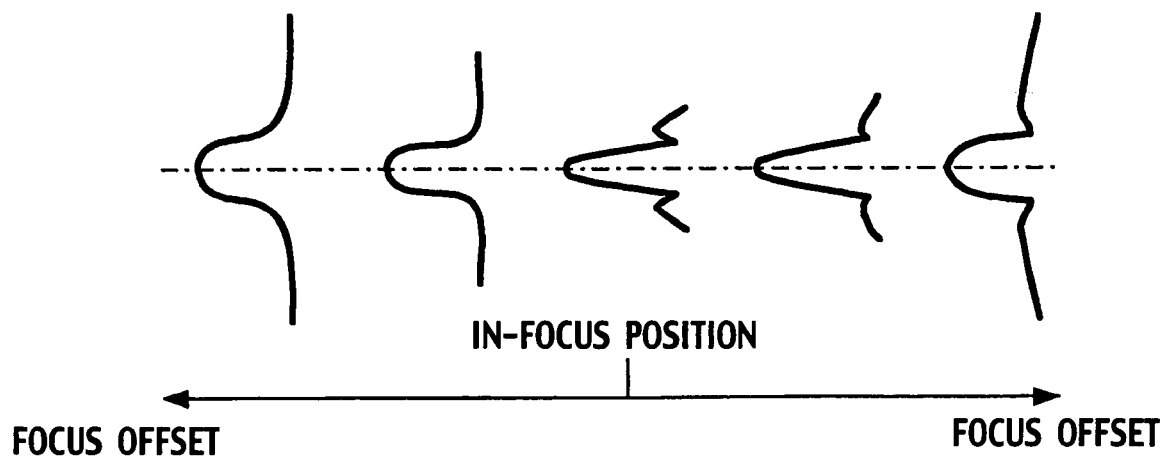
FIG. 2B is a view showing changes in light intensity distribution around an optical axis of a condensed beam spot with respect to focus offsets.

The sign (positive or negative) of the difference („Ga−„Gb) between the differences „Ga and „Gb indicates the side (+ or −) where a spherical aberration occurs. The absolute value |„Ga−„Gb| thereof serves as a control quantity for correcting the aberration. As is apparent from FIGS. 15A to 15C, „Ga<„Gb if a spherical aberration occurs on the (−) side, and „Ga>„Gb if a spherical aberration occurs on the (+) side. If there is no spherical aberration, „Ga=„Gb. Accordingly, the threshold value Th2 in step S214 of FIG. 14 is set to the absolute value |„Ga−„Gb| that establishes the conditions of FIG. 1 5B (the conditions to contain a spherical aberration within an allowance).

As explained with reference to FIG. 14, if |„Ga−„Gb|>Th2, the aberration correction controller 10a2 employs („Ga−„Gb) as an error value to control the aberration corrector 6. Controlling the aberration corrector 6 results in shifting the focal point of the condensed beam spot 15, and therefore, the spherical aberration may not quickly fall within an allowance. Accordingly, steps S208 to S215 are repeated until |„Ga−„Gb|≦Th2 is satisfied in step S214.

The second embodiment explained above reproduces a random signal having a plurality of amplitudes and periods, extracts long-period and short-period reproduced signals from specific portions of the reproduced random signal or of an interpolated signal thereof, and finds the differences „Ga=(LA−SA) and „Gb=(LA'−SA') between the amplitudes LA and LA' of the long-period reproduced signals and the amplitudes SA and SA' of the short-period reproduced signals. Each long-period reproduced signal consists of a signal portion having a period equal to or longer than a first period (for example, an inversion interval of 6 or larger). Each short-period reproduced signal consists of a signal portion having a second period (for example, an inversion interval of 3) that is shorter than the first period and is within a predetermined range.

The second embodiment can correct an aberration without regard to the conditions of the optical disk 11. Only by moving the objective lens 7 along an optical axis by „ before and after the in-focus position of the objective lens 7 and by finding the differences „Ga=(LA−SA) and „Gb=(LA'−SA') between the amplitudes LA and LA' of long-period reproduced signals and the amplitudes SA and SA' of short-period reproduced signals, the second embodiment obtains control data for the aberration corrector 6. Compared with the aberration correction method stipulated in the Patent Document 1, the second embodiment can more quickly accomplish aberration correction.

As is apparent from comparison between the first embodiment of FIGS. 10A to 10C and the second embodiment of FIGS. 15A to 15C, |„Ga−„Gb| is greater than |Ga−Gb| and the rate of change of |„Ga−„Gb| is greater than the rate of change of |Ga−Gb|. Accordingly, the second embodiment can more efficiently and precisely correct an aberration than the first embodiment.

Third Embodiment

The third embodiment of the present invention basically employs the same structure as the first embodiment explained with reference to FIG. 5. An aberration correction controller of the third embodiment is different from those shown in FIGS. 6 and 12. The third embodiment forms the aberration correction controller with the use of a part of the signal processing circuit 20. Like the first and second embodiments, the third embodiment reproduces a random signal recorded in the optical disk 11 and corrects an aberration.

FIG. 16 shows the aberration correction controller 10a3 according to the third embodiment. As shown in FIG. 16, the aberration correction controller 10a3 has an A/D converter 131, a zero-cross detector 132, an interpolator 133, a partial response (PR) determining unit 134, a filtering unit 135, and an aberration adjuster 136. The components from the A/D converter 131 to the PR determining unit 134 are arranged in the signal processing circuit 20. The filtering unit 135 and aberration adjuster 136 are arranged in the servo circuit 10. A Viterbi decoder 200 binarizes an input signal from the PR determining unit 134 according to a maximum likelihood decoding technique.

The A/D converter 131 converts a reproduced signal from the high-frequency amplifier 9 into a digital signal. A sampling clock used by the A/D converter 131 is a clock synchronized with the bit rate of the reproduced signal through a PLL circuit. The digital signal from the A/D converter 131 is supplied to the zero-cross detector 132 and interpolator 133. The components from the zero-cross detector 132 to the filtering unit 135 generate an error value for controlling the aberration corrector 6 according to the procedure mentioned below, to correct a spherical aberration.

In FIG. 16, the zero-cross detector 132 detects zero-cross information according to a procedure like that of the second embodiment and supplies the same to the PR determining unit 134. The interpolator 133 delays the reproduced signal by 180°, finds an average of the preceding sampled signal and current sampled signal, and supplies average data (interpolated signal) to the PR determining unit 134 and filtering unit 135. According to the zero-cross information Z and average data, the PR determining unit 134 determines a target value for a sampling point according to run-length limitation (RLL) of the reproduced signal and a state transition determined by PR characteristics.

The PR characteristics will be explained. When the characteristics of PR (a, b, b, a) are added to a solitary wave and when the solitary wave is equalized, the equalized waveform takes one of seven values of 0, 1, a+b, 2a, 2b, a+2b, and 2a+2b in the case of RLL(1, 7). The value is supplied to the Viterbi decoder 200. An input value to the Viterbi decoder 200 and a reproduced signal (output value) after PR equalization are restricted by a past signal. RLL(1,7) never continuously provides an input signal of "1" two or more times. Accordingly, input/output values are expressible with a state transition model of FIG. 17. S0 to S5 in FIG. 17 are states determined by the preceding output values.

In FIG. 17, if state S2 receives an input value of 1, it provides an output value of a+2b and shifts to state S3, or provides an output value of 2b and shifts to state S4.

Zero-cross information Z of "1" indicates that a zero-cross point has been detected. This occurs in FIG. 17 when state S1 changes to state S2, or when state S4 changes to state S5. In this case, states S2, S3, and S4 of FIG. 17 pass a route of positive value (when normalized to a+b=0, any one of a+2b, 2a+2b, and 2b), and states S5, S0, and S1 pass a route of negative value (when normalized to a+b=0, any one of 0, a, and 2a). Accordingly, by referring to a value before or after a zero-cross point, it is possible to determine whether a route is of a positive value or of a negative value. In the state transition diagram of FIG. 17, zero-cross information Z will be "0" when it is not a zero-cross point.

If an interval between a given zero-cross point and the next zero-cross point (i.e., the number of times of transition from state S2 to state S5, or from state S5 to state S2) is known, a route will be determined, and a data value to be taken at each sampling point will be finalized.

From the state transition diagram of FIG. 17, it is apparent that two pieces of zero-cross information Z of "1" are not consecutively provided. In the case of RLL(1, X), there are at least one piece of zero-cross information Z of "0" between adjacent zero-cross points. If zero-cross information Z changes from "1" to "0" to "1," state transition occurs in order of S1, S2, S4, and S5, or S4, S5, S1, and S2. In the case of RLL(2, X), there are at least two pieces of zero-cross information Z of "0" between adjacent zero-cross points.

The PR determining unit 134 determines a target value for each sampling point according to the above-mentioned PR characteristics. If PR(a, b, b, a) characteristics are provided with a minimum ran-length limitation of 2 (minimum inversion interval of 3) for a reproduced signal, the paths of S2 to S4 and S5 to S1 in FIG. 17 are not present, and only a circular path is present. States that involve zero-crossing are S2 and S5, and therefore, a target value for each sampling point will be determined if the polarity of the sampling point and an interval between zero-cross points are known. If a minimum run-length limitation of 1 (minimum inversion interval of 2) is applied to a reproduced signal, the state transition of FIG. 17 will occur. In this case, states that involve zero-crossing points are S2 and S5, and a target value for each sampling point is similarly determinable.

In this way, the PR determining unit 134 refers to zero-cross information Z from the zero-cross detector 132, the polarity of a sampling point, and average data from the interpolator 133 and generates determination data that indicates a target value to which the average data corresponds.

The filtering unit 135 uses the determination data from the PR determining unit 134 and classifies the average data from the interpolator 133 according to the target value. Here, no zero level is used, and therefore, is omitted.

The details of this are shown in FIG. 18. The filtering unit 135 classifies average data according to a target value 2a+2b, a+2b, a, or 0 provided by the PR determining unit 134 and finds average values PL, PS, BS, and BL for the classified data groups. In FIG. 18, average data groups containing white circles belong to the target values of 2a+2b and 0, and average data groups containing black circles belong to the target values of a+2b and a.

Each average data group belonging to the target value of 2a+2b takes a value close to a peak value of a long-period signal, each average data group belonging to the target value of 0 takes a value close to a bottom value of the long-period signal, each average data group belonging to the target value of a+2b takes a value close to a peak value of a short-period signal, and each average data group belonging to the target value of a takes a value close to a bottom value of the short-period signal.

Accordingly, the average values PL and BL approximate the peak and bottom values of the long-period signal, respectively, and the average values PS and BS approximate the peak and bottom values of the short-period signal, respectively.

Further, the filtering unit 135 uses, like the second embodiment, the above-mentioned expressions (3) and (4) to find an amplitude LA of the long-period reproduced signal and an amplitude SA of the short-period reproduced signal as peak-to-peak values. The amplitudes LA and SA may be peak or bottom values themselves.

Like the second embodiment explained with reference to FIG. 14, the filtering unit 135 finds the difference „Ga=(LA−SA) between the long-period amplitude LA and the short-period amplitude SA that are obtained by moving the objective lens 7 along the optical axis by +„ from the in-focus position. The filtering unit 135 also finds the difference „Gb=(LA'−SA') between a long-period amplitude LA' and a short-period amplitude SA' by moving the objective lens 7 along the optical axis by −„ from the in-focus position. The aberration adjuster 136 uses („Ga−„Gb) as an error value to control the aberration corrector 6 to change the diverging or converging angle of a laser beam made incident to the objective lens 7 and correct a spherical aberration of the condensed beam spot 15.

The third embodiment mentioned above reproduces a random signal having a plurality of amplitudes and periods and extracts a long-period reproduced signal (interpolated signal) and short-period reproduced signal (interpolated signal) from specific periods of an interpolated signal of the reproduced random signal. Based on long-and short-period reproduced signals thus extracted, the third embodiment finds the differences „Ga=(LA−SA) and „Gb=(LA'−SA') between the amplitudes LA and LA' of the long-period reproduced signals and the amplitudes SA and SA' of the short-period reproduced signals. The long-period reproduced signal is a signal portion having a period equal to or larger than a first period (for example, an average data group fall in the target value of 2a+2b or 0). The short-period reproduced signal is a signal portion having a second period (for example, an average data group fall in the target value of a+2b or a) that is smaller than the first period and is within a predetermined range.

The third embodiment can correct an aberration without regard to the conditions of the optical disk 11. Only by moving the objective lens 7 by „ before and after the in-focus position of the objective lens 7 and by finding the differences „Ga=(LA−SA) and „Gb=(LA'−SA') between the amplitudes LA and LA' of long-period reproduced signals and the amplitudes SA and SA' of short-period reproduced signals, the third embodiment can obtain control data for the aberration corrector 6. Compared with the aberration correction method stipulated in the Patent Document 1, the third embodiment can more quickly accomplish aberration correction.

According to the third embodiment, the interpolator 133 interpolates a reproduced signal, and the interpolated signal is used by the PR determining unit 134 for PR determination. Depending on a sampling method achieved by the A/D converter 131, a reproduced random signal may be directly used for PR determination. This is applicable to other embodiments mentioned below.

Fourth Embodiment

The fourth embodiment of the present invention basically employs the same structure as the first embodiment explained with reference to FIG. 5. An aberration correction controller of the fourth embodiment is different from those shown in FIGS. 6, 12, and 16. The fourth embodiment forms the aberration correction controller with the use of a part of the signal processing circuit 20. Like the first to third embodiments, the fourth embodiment reproduces a random signal recorded in the optical disk 11 and corrects an aberration.

FIG. 19 shows the aberration correction controller 10a4 according to the fourth embodiment. As shown in FIG. 19, the aberration correction controller 10a4 has an A/D converter 141, a DPLL (digital phase locked loop) unit 142, a partial response (PR) determining unit 143, a filtering unit 144, and an aberration adjuster 145. The components from the A/D converter 141 to the PR determining unit 143 are arranged in the signal processing circuit 20. The filtering unit 144 and aberration adjuster 145 are arranged in the servo circuit 10.

The A/D converter 141 operates according to an autonomous clock of fixed frequency. The A/D converter 141 samples a reproduced signal from the high-frequency amplifier 9 and supplies the sampled signal to the DPLL unit 142. The DPLL unit 142 has a self-contained PLL function, interpolates the input reproduced signal by itself, and generates a resampled signal. At the same time, the DPLL unit 142 extracts a phase error, feeds back the same, and controls the timing of interpolation.

The DPLL unit 142 is configured as shown in FIG. 20. A resampling interpolator 1421 resamples the sampled signal from the A/D converter 141 according to a timing signal provided by a timing generator 1424, finds an average of the current sampled signal and the preceding sampled signal, interpolates the average, and supplies the interpolated signal as a resampled signal to a phase error detector 1422.

The phase error detector 1422 supplies the interpolated resampled signal to the filtering unit 144, detects a phase error, and supplies a phase error signal to a loop filter 1423. When detecting a phase error, the phase error detector 1422 also detects a zero cross and supplies zero-cross information Z to the filtering unit 144. The loop filter 1423 extracts a low component from the phase error signal, and supplies the same as error level information to the timing generator 1424. Based on the error level information, the timing generator 1424 generates a timing signal.

In this way, the DPLL unit 142 can interpolate, at correct timing, the output of the A/D converter 141 operating at an autonomous clock and provide an interpolated resampled signal. At the same time, the phase error detector 1422 can provide zero-cross information Z.

The resampled signal and zero-cross information Z provided by the DPLL unit 142 are supplied to the PR determining unit 143. Like the third embodiment, the PR determining unit 143 uses the zero-cross information Z and resampled signal and determines a target value according to run-length limitation (RLL) applied to the reproduced signal and state transition determined from PR characteristics.

The filtering unit 144 receives the resampled signal from the DPLL unit 142 and determination data for a target value from the PR determining unit 143. According to a procedure like that of the third embodiment, the filtering unit 144 finds the differences „Ga=(LA−SA) and „Gb=(LA'−SA') between the amplitudes LA and LA' of long-period reproduced signals and the amplitudes SA and SA' of short-period reproduced signals. The aberration adjuster 145 uses („Ga−,„Gb) as an error value to control the aberration corrector 6 to change the diverging or converging angle of a laser beam made incident to the objective lens 7 and correct a spherical aberration of the condensed beam spot 15.

Like the third embodiment, the fourth embodiment reproduces a random signal having a plurality of amplitudes and periods, extracts a long-period reproduced signal and short-period reproduced signal from a specific portion of the reproduced random signal or an interpolated signal thereof, and finds the differences „Ga=(LA−SA) and „Gb=(LA'−SA') between the amplitudes LA and LA' of long-period reproduced signals and the amplitudes SA and SA' of short-period reproduced signals. The long-period reproduced signal is a signal portion having a period equal to or longer than a first period, and the short-period reproduced signal is a signal portion having a second period that is shorter than the first period and is within a predetermined range.

The fourth embodiment can correct an aberration without regard to the conditions of the optical disk 11. Only by moving the objective lens 7 by „ before and after the in-focus position of the objective lens 7 and by finding the differences „Ga=(LA−SA) and „Gb=(LA'−SA') between the amplitudes LA and LA' of long-period reproduced signals and the amplitudes SA and SA' of short-period reproduced signals, the fourth embodiment can obtain control data for the aberration corrector 6. Compared with the aberration correction method stipulated in the Patent Document 1, the fourth embodiment can more quickly accomplish aberration correction.

Fifth Embodiment

The fifth embodiment of the present invention basically employs the same structure as the first embodiment explained with reference to FIG. 5. An aberration correction controller of the fifth embodiment is different from those shown in FIGS. 6, 12, 16, and 19. The fifth embodiment forms the aberration correction controller with the use of a part of the signal processing circuit 20. Like the first to fourth embodiments, the fifth embodiment reproduces a random signal recorded in the optical disk 11 and corrects an aberration.

FIG. 21 shows the aberration correction controller 10a5 according to the fifth embodiment. As shown in FIG. 21, the aberration correction controller 10a5 has an A/D converter 151, a DPLL unit 152, a partial response (PR) determining/equalizing unit 153, a filtering unit 154, and an aberration adjuster 155. The components from the A/D converter 151 to the PR determining/equalizing unit 153 are arranged in the signal processing circuit 20. The filtering unit 154 and aberration adjuster 155 are arranged in the servo circuit 10.

The fifth embodiment is characterized in that the PR determining/equalizing unit 153 refers to a resampled signal and zero-cross information Z provided by the DPLL unit 152, to temporarily determine a target value according to state transition determined by PR equalization and run-length limitation. In addition, the PR determining/equalizing unit 153 determines whether or not an error of an actual resampled signal with respect to a target value must be equalized.

As explained in the third embodiment of FIGS. 17 and 18, states S2 and S5 correspond to a zero point, 2a+2b is a maximum target value on the positive side, and 0 is a maximum target value on the negative side. A resampled signal related to one of these target values is not subjected to error equalization, and a resampled signal related to one of the other target values a+2b, a+b, and a is subjected to error equalization. Namely, a short-period resampled signal related to one of the target values a+2b, a+b, and a is subjected to waveform equalization. This results in suppressing crosstalk between signals during a change from a long period to a short period. Consequently, a long-period resampled signal related to one of the target values 2a+2b and 0 changes according to an input signal. On the other hand, a short-period resampled signal related to one of the other target values a+2b, a+b, and a is equalized to have substantially a constant value.

More precisely, resampled signals indicated with black circles in FIG. 18 and belonging to the target values a+2b and a and resampled signals (signals around zero-cross points) belonging to the target value a+b are substantially equalized through an equalizing operation. Then, only resampled signals related to the target values 2a+2b and 0 reflect actual amplitudes.

Accordingly, the filtering unit 154 can detect the peak value PL and bottom value BL of a long-period signal and the amplitude LA(=PL−BL) of the long-period signal without the influence of crosstalk between signals. As a result, the fifth embodiment can correctly find the amplitude LA of a long-period signal relative to a focus offset of the objective lens 7. According to the fifth embodiment, the amplitude SA(=PS−BS) of a short-period signal is substantially constant.

According to the fifth embodiment, the maximum amplitude of a long-period reproduced signal changes with respect to a focus offset along a characteristic curve indicated with a two-dots-and-dash line in FIGS. 22A to 22C. The maximum amplitude of a short-period reproduced signal changes with respect to a focus offset along a constant characteristic curve indicated with a dot-and-dash line in FIGS. 22A to 22C. Accordingly, „Ga=(LA−SA) and „Gb=(LA'−SA') provided by the filtering unit 154 reflect only changes in the amplitudes LA and LA' of long-period reproduced signals.

The amplitudes SA and SA' of short-period reproduced signals have the same value, and therefore, „Ga=LA and „Gb=LA' as shown in FIGS. 23A to 23C.

The fifth embodiment reproduces a random signal having a plurality of amplitudes and periods, extracts long- and short-period reproduced signals from specific portions of the reproduced random signal or of an interpolated signal thereof, and finds the differences „Ga=(LA−SA) and „Gb=(LA'−SA') between the amplitudes LA and LA' of the long-period reproduced signals and the amplitudes SA and SA' of the short-period reproduced signals. The amplitudes SA and SA' of the short-period reproduced signals are not amplitude values but they substantially have a constant value equalized by the PR determining/equalizing unit 153.

If „Ga=LA and „Gb=LA', the fifth embodiment extracts a long-period reproduced signal as a specific portion having a specific period of a reproduced random signal.

The fifth embodiment can correct an aberration without regard to the conditions of the optical disk 11. Only by moving the objective lens 7 by „ before and after the in-focus position of the objective lens 7 and by finding the differences „Ga=(LA−SA) and „Gb=(LA'−SA') between the amplitudes LA and LA' of long-period reproduced signals and the amplitudes SA and SA' of short-period reproduced signals, the fifth embodiment obtains control data for the aberration corrector 6. Compared with the aberration correction method stipulated in the Patent Document 1, the fifth embodiment can more quickly accomplish aberration correction.

Sixth Embodiment

The sixth embodiment is a modification of the fifth embodiment. FIG. 24 shows an aberration correction controller 10a6 according to the sixth embodiment. In FIG. 24, the aberration correction controller 10a6 has an A/D converter 161, a zero-cross detector 162, a partial response (PR) determining/equalizing unit 163, a filtering unit 164, and an aberration adjuster 165. The components from the A/D converter 161 to the PR determining/equalizing unit 163 are arranged in the signal processing circuit 20. The filtering unit 164 and aberration adjuster 165 are arranged in the servo circuit 10.

As mentioned above, the fifth embodiment carries out resampling and interpolation in the DPLL unit 152. The sixth embodiment carries out no resampling. In FIG. 24, the AID converter 161 samples a reproduced signal in synchronization with the bit rate of the reproduced signal supplied from a PLL circuit. The sampled signal is supplied to the zero-cross detector 162 and PR determining/equalizing unit 163. According to zero-cross information Z from the zero-cross detector 162, the PR determining/equalizing unit 163 temporarily determines a target value according to state transition determined by PR equalization and run-length limitation.

The sixth embodiment can correct an aberration without regard to the conditions of the optical disk 11. Compared with the aberration correction method stipulated in the Patent Document 1, the sixth embodiment can more quickly accomplish aberration correction.

Seventh Embodiment

The seventh embodiment of the present invention basically employs the same structure as the first embodiment explained with reference to FIG. 5. An aberration correction controller of the seventh embodiment is different from those shown in FIGS. 6, 12, 16, 19, 21, and 24. Like the first to sixth embodiments, the seventh embodiment reproduces a random signal recorded in the optical disk 11 and corrects an aberration.

FIG. 25 shows the aberration correction controller 10a7 according to the seventh embodiment. The aberration correction controller 10a7 is arranged in the servo circuit 10. As shown in FIG. 25, the aberration correction controller 10a7 has an A/D converter 171, an ATC (automatic threshold level control) circuit 172, an AGC circuit 173, an envelope detector 177, a filtering unit 178, and an aberration adjuster 179. The AGC circuit 173 includes a gain controlling circuit 174, a cross extractor 175, and an error detector 176.

In FIG. 25, the A/D converter 171 samples an input reproduced signal according to an autonomous clock of fixed frequency and supplies the sampled signal to the ATC circuit 172. The ATC circuit 172 conducts DC control so that a center level (DC level) of the input sampled signal may agree with an optimum threshold value that is set in advance and supplies the DC-controlled signal to the AGC circuit 173. The AGC circuit 173 controls the gain of the output of the ATC circuit 172 such that a relatively short inversion interval signal may have a constant magnitude and supplies the gain-controlled signal to the envelope detector 177.

The gain controlling circuit 174 of the AGC circuit 173 controls the gain of the output of the ATC circuit 172 according to a gain error signal detected by the error detector 176 and supplies the gain-controlled signal to the envelope detector 177 and cross extractor 175. The error detector 176 outputs a gain error signal according to the output of the cross extractor 175. The details of the structure and operation of the cross extractor 175 will be explained.

As shown in FIG. 26, the cross extractor 175 beforehand stores an intermediate-level threshold value Th10 that is set around a center level of an amplitude Q of a minimum inversion interval of a reproduced signal Sr, a large-level threshold value Th11 that is greater than the threshold value Th10, and a small-level threshold value Th12 that is smaller than the threshold level Th10. A level difference between the threshold values Th10 and Th11 and a level difference between the threshold values Th10 and Th12 are equal to each other and equal to P. The level difference P is set to be smaller than the amplitude Q of the minimum inversion interval. Accordingly, one of the three threshold values Th10, Th11, and Th12 always indicates a correct zero-cross value. According to the example of FIG. 26, the threshold value Th10 is a zero-cross value.

The cross extractor 175 separately accumulates the numbers of times of the reproduced signal Sr crossing the threshold values Th10, Th11, and Th12. When one of the three accumulated values reaches a preset value, the three accumulated values are entirely cleared, and the same operation is repeated.

The cross extractor 175 is configured as shown in FIG. 27. In FIG. 27, cross detectors 1751 to 1753 receive a reproduced signal Sr from the gain controlling circuit 174. The cross detectors 1751, 1752, and 1753 have the threshold values Th10, Th11, and Th12, respectively. Whenever the reproduced signal Sr crosses the threshold values Th10, Th11, and Th12, the cross detectors 1751, 1752, and 1753 provide cumulative count values (cross count values) C0, C1, and C2, respectively. The cross count values C0, C1, and C2 from the cross detectors 1751, 1752, and 1753 are supplied to comparators 1754, 1755, and 1756, respectively. The comparators 1754 to 1756 compare the input cross count values C0 to C2 with a common set value and provide comparison results to a 3-input OR circuit 1757.

The set value supplied to the comparators 1754 to 1756 is an average zero-cross count value for a period that is sufficiently longer than the minimum inversion interval. Each of the comparators 1754 to 1756 provides a coincidence signal of "H" when detecting coincidence with the set value.

The comparator (one of the comparators 1754 to 1756) that receives one of the cross count values that has first reached the set value outputs a coincidence signal of "H," which is commonly supplied as a reset pulse to the cross detectors 1751 to 1753 to reset the cross detectors 1751 to 1753.

In this way, one of the three threshold values Th10, Th11, and Th12 always indicates a correct zero-cross value, and therefore, the cross count value that has first reached the set value always contains the minimum inversion interval. The cross count value that has first reached the set value is used by the error detector 176 for an error process. Generally, the number of times of a reproduced signal Sr crossing the center threshold value Th10 is the largest among those related to the three threshold values Th10, Th11, and Th12. In this case, the cross count value C0 provided by the cross detector 1752 first reaches the set value.

Returning to FIG. 25, the error detector 176 receives the cross count values C0 to C2 and reset pulse from the cross extractor 175 and generates a DC error signal so that the cross count value C0 becomes greater than the cross count values C1 and C2 in a predetermined unit time and so that the cross count values C1 and C2 are substantially equal to each other. At the same time, the error detector 176 generates a gain error signal so that the cross count values C1 and C2 have a given ratio with respect to the cross count value C0. The DC error signal and gain error signal are supplied to the gain controlling circuit 174. In response to the gain error signal, the gain controlling circuit 174 controls the gain of the output of the ATC circuit 172. As a result, the gain of the output of the ATC circuit 172 is controlled so that each signal having a relatively short inversion interval may have a given magnitude.

Operation of the error detector 176 will be further explained with reference to the flowchart of FIG. 28. In FIG. 28, step S301 determines whether or not a reset pulse from the cross extractor 175 is "H." If it is "H," step S302 determines whether or not C0≧C1 and C0≧C2 in a relationship between the cross count value C0 and the cross count values C1 and C2. If the conditions are met, it means that the reproduced signal is within an intended amplitude range.

Step S303 determines whether or not the cross count values C1 and C2 are greater than a predetermined value. If they are greater than the predetermined value, step S304 determines that the amplitude of the reproduced signal is large and provides a gain error signal to decrease the gain of the reproduced signal. The predetermined value is a value about 70% of the cross count value C0 in consideration of the influence of noise.

If step S303 determines that the cross count values C1 and C2 are not greater than the predetermined value, step S305 checks to see if the cross count values C1 and C2 are smaller than a predetermined value. If they are smaller than the predetermined value, step S306 determines that the amplitude of the reproduced signal is small and provides a gain error signal to increase the gain of the reproduced signal. If step S302 determines that the conditions of C0≧C1 and C0≧C2 are not met, or if step S305 determines that the cross count values C1 and C2 are not smaller than the predetermined value, step S307 provides no gain error signal.

Through the steps mentioned above, an example reproduced signal waveform shown in FIG. 29A is gain-controlled so that the amplitude of each short-period reproduced signal having a relatively short inversion interval may become substantially constant as shown in FIG. 29B. The envelope detector 177 detects an upper envelope La and a lower envelope Lb from the reproduced signal shown in FIG. 29B provided by the gain controlling circuit 174. Like the first embodiment, the filtering unit 178 finds an amplitude Ga of the reproduced signal according to the envelopes La and Lb detected by the envelope detector 177 after the objective lens 7 is moved along an optical axis by +,, from the in-focus position. Also, the filtering unit 178 finds an amplitude Gb of the reproduced signal according to envelopes La and Lb detected by the envelope detector 177 after the objective lens 7 is moved along the optical axis by −,, from the in-focus position.

The aberration adjuster 179 uses (Ga−Gb) as an error value to control the aberration corrector 6 to change the diverging or converging angle of a laser beam made incident to the objective lens 7 and correct a spherical aberration of the condensed beam spot 15.

The seventh embodiment conducts gain control to make the amplitude of each short-period reproduced signal substantially constant, clearly separates the short-period reproduced signal from a long-period reproduced signal, and correctly detects the envelopes La and Lb and amplitudes Ga and Gb of long-period reproduced signals. Accordingly, the seventh embodiment provides an effect equivalent to that provided by the fifth embodiment that conducts a waveform equalizing operation. The seventh embodiment needs no PLL circuit, and therefore, can correctly obtain aberration correction data without a tracking servo function. The amplitudes Ga and Gb are substantially maximum amplitudes.

The seventh embodiment can correct an aberration without regard to the conditions of the optical disk 11. Only by moving the objective lens 7 by ,, before and after the in-focus position of the objective lens 7 and by finding the maximum amplitudes Ga and Gb of specific portions of a reproduced random signal, the seventh embodiment can obtain control data for the aberration corrector 6. Compared with the aberration correction method stipulated in the Patent Document 1, the seventh embodiment can more quickly accomplish aberration correction.

Eighth Embodiment

The eighth embodiment of the present invention basically employs the same structure as the first embodiment explained with reference to FIG. 5. An aberration correction controller of the eighth embodiment is different from those shown in FIGS. 6, 12, 16, 19, 21, 24, and 25. The aberration correction controller 10a8 of the eighth embodiment is arranged in a servo circuit 10 and is characterized in that it conducts aberration correction with control data being a boost quantity required to equalize a waveform when processing a signal in an optical disk unit. Like the first to seventh embodiments, the eighth embodiment reproduces a random signal recorded in the optical disk 11 and corrects an aberration.

In FIG. 30, a signal processing circuit has a waveform equalizer (boost quantity calculation circuit) 201. The waveform equalizer 201 sets a boost quantity to increase the gain of a small-amplitude signal band according to the characteristics of a reproduced signal that may vary depending on an optical disk, adjusts signal transmission characteristics, and prevents an error in signal processes that follow. The boost quantity provided by the waveform equalizer 201 is supplied to the aberration correction controller 10a8 in the servo circuit 10.

FIG. 31 shows an aberration correction procedure according to the eighth embodiment. Steps S401 to S407 of FIG. 31 are the same as steps S101 to S107 of FIG. 9, and therefore, step S407 and steps that follow will be explained. In FIG. 31, step S407 starts reproducing recorded information, the servo circuit 10 detects in step S408 an in-focus position of an objective lens 7. In step S409, the servo circuit 10 moves the objective lens 7 along an optical axis by +,, from the in-focus position. In step S410, the aberration correction controller 10a8 detects a boost quantity Ba provided by the waveform equalizer 201.

In step S411, the servo circuit 10 moves the objective lens 7 along the optical axis by -,, from the in-focus position. In step S412, the aberration correction controller 10a8 detects a boost quantity Bb provided by the waveform equalizer 201.

In step S413, the aberration correction controller 10a8 finds the difference (Ba-Bb) between the boost quantities obtained at the respective positions of the objective lens 7, and in step S414, determines whether or not the absolute value |Ba-Bb| of the difference is equal to or smaller than a predetermined threshold Th3. The threshold value Th3 is a value close to 0. If |Ba-Bb| is not equal to or smaller than the threshold value Th3, the aberration correction controller 10a8 uses, in step S415, the difference (Ba-Bb) as an error value to control the aberration corrector 6, which changes the diverging or converging angle of a laser beam made incident to the objective lens 7 to correct a spherical aberration of a condensed beam spot 15. After step S415, step S408 and steps that follow are repeated.

If a reproduced signal from the optical disk 11 has random characteristics under standard run-length limitation and if the thickness t of the transparent substrate 13 of the optical disk 11 is out of an allowance to cause a spherical aberration, the maximum amplitudes of long- and short-period reproduced signals change as shown in FIGS. 15A to 15C with respect to focus offsets of the objective lens 7. On the other hand, a boost quantity provided by the waveform equalizer 201 is a control value to increase the gain of a small-amplitude signal band and equalize a waveform. The boost quantity increases if the amplitude ratio of a short-period signal to a long-period signal is small, and decreases if the amplitude ratio is large.

Figure 32A:
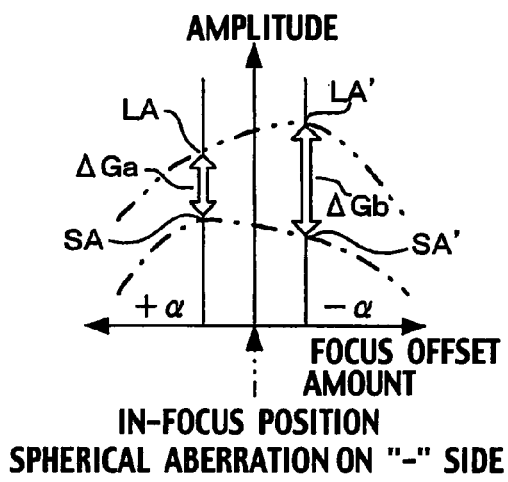
FIG. 32A is a characteristic diagram showing a state of spherical aberration according to the eighth embodiment.
Figure 32D:
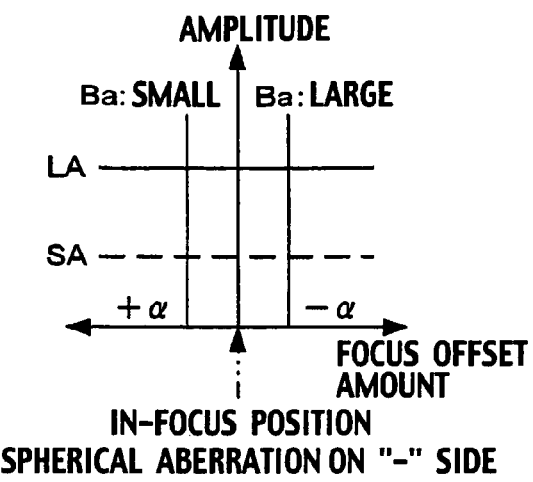
FIG. 32D is a characteristic diagram showing a state of spherical aberration according to the eighth embodiment.
Figure 32B:
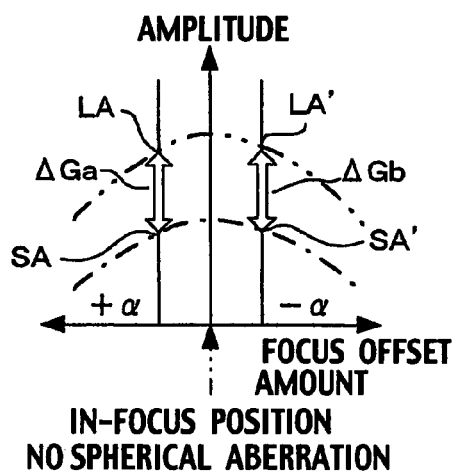
FIG. 32B is a characteristic diagram showing a state of spherical aberration according to the eighth embodiment.
Figure 32E:
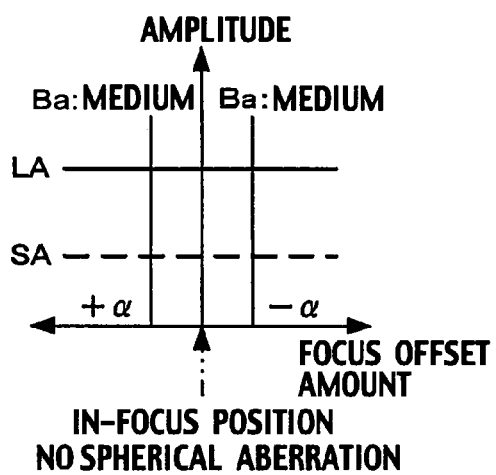
FIG. 32E is a characteristic diagram showing a state of spherical aberration according to the eighth embodiment.
Figure 32C:
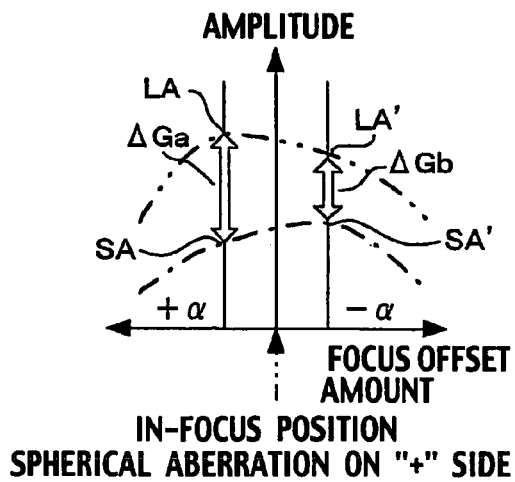
FIG. 32C is a characteristic diagram showing a state of spherical aberration according to the eighth embodiment.
Figure 32F:
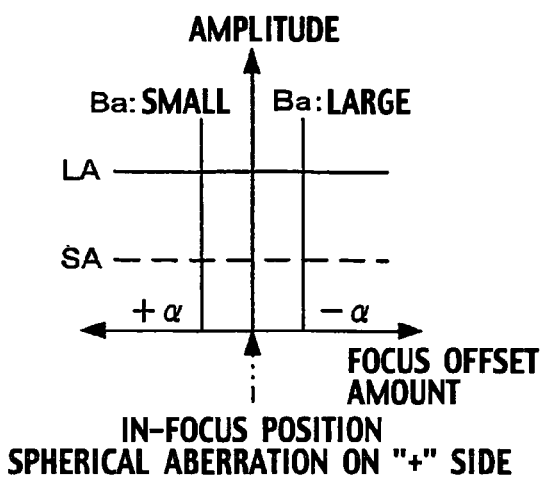
FIG. 32F is a characteristic diagram showing a state of spherical aberration according to the eighth embodiment.
Figure 33A:
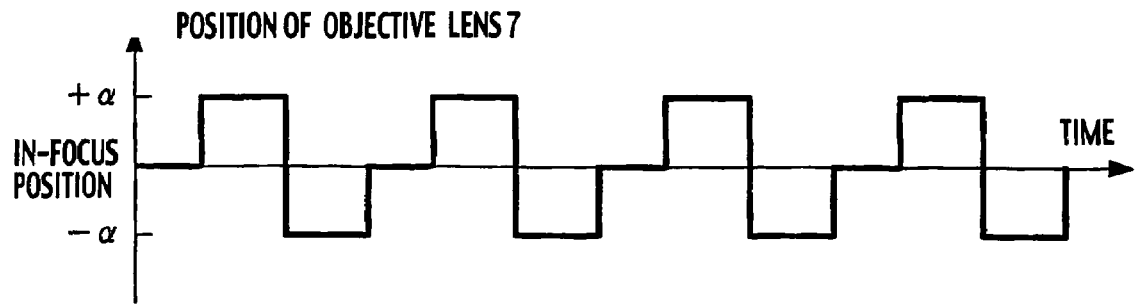
FIG. 33A is a timing chart explaining the aberration correcting method according to the eighth embodiment.
Figure 33B:
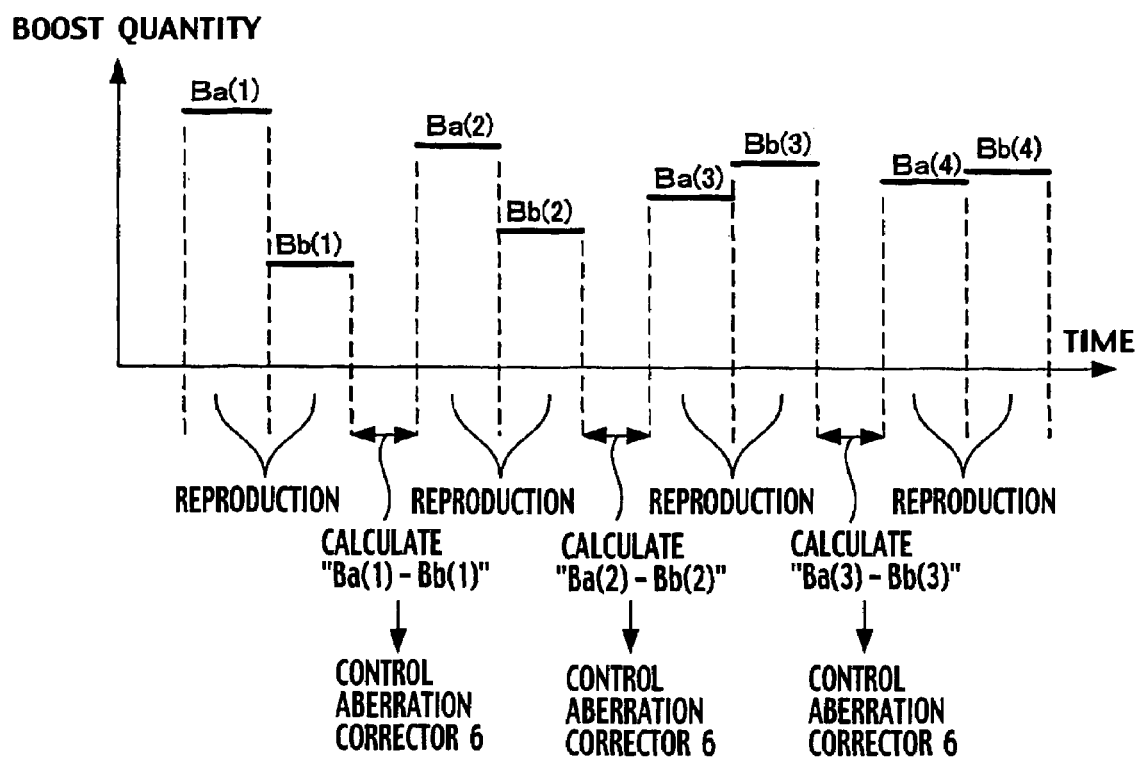
FIG. 33B is a timing chart explaining the aberration correcting method according to the eighth embodiment.

FIGS. 32A to 32C show the states of FIGS. 15A to 15C. In each of the states shown in FIGS. 32A to 32C, the waveform equalizing operation by the waveform equalizer 201 makes the maximum amplitudes LA and SA of long- and short-period reproduced signals constant as shown in FIGS. 32D to 32F without regard to a spherical aberration or focus offset. The boost quantities Ba and Bb to make the maximum amplitudes LA and SA constant differ from one another in FIGS. 32D to 32F. The boost quantities Ba and Bb are values indicating the amplitude ratio of a short-period signal to a long-period signal.

Due to the facts mentioned above, the difference (Ba-Bb) between the boost quantities can be used as control data for the aberration corrector 6 to correct a spherical aberration. As explained with reference to FIG. 31, the eighth embodiment uses the difference (Ba-Bb) between the boost quantities as control data for the aberration corrector 6 to correct a spherical aberration.

FIG. 33A shows positional changes of the objective lens 7 and FIG. 33B shows changes in the boost quantities Ba and Bb in repetitive control. In FIG. 33B, a numeral between parentheses in each of Ba(1), Ba(2), Ba(3), . . . and Bb(1), Bb(2), Bb(3), . . . is an ordinal number indicating the detection of boost quantities Ba and Bb in steps S410 and S412 of FIG. 31. It is understood that the repetitive control of spherical aberration correction by the aberration correction controller 10a8 can converge the absolute value |Ba-Bb| to substantially zero.

The eighth embodiment generates control data for the aberration corrector 6 according to the boost quantities Ba and Bb provided by the waveform equalizer 201. This simplifies the circuit structure of the aberration correction controller 10a8 and economically achieves aberration correction.

The eighth embodiment can correct an aberration without regard to the conditions of the optical disk 11. Only by moving the objective lens 7 by ,, before and after the in-focus position of the objective lens 7 and by finding boost quantities Ba and Bb, the eighth embodiment can obtain control data for the aberration corrector 6. Compared with the aberration correction method stipulated in the Patent Document 1, the eighth embodiment can more quickly accomplish aberration correction.

The aberration correction according to any one of the first to eighth embodiments may be carried out independently of the recording and reproducing operations of information signals to and from a standard optical disk 11, or may be carried out during the recording and reproducing operations of information signals to and from the optical disk 11.

Recording and reproducing information signals to and from the optical disk 11 are achievable at a higher speed than an actual time of the information signals. Accordingly, the optical disk 11 may be turned at a linear speed higher than a speed specified for a format of the disk and the aberration correction may be carried out while no information signals are being recorded and reproduced to and from the optical disk 11.

The thickness t of the transparent substrate 13 of the optical disk 11 may vary between the inner circumferential side and the outer circumferential side of the optical disk 11. Accordingly, a spherical aberration may vary depending on a position (track) where an information signal is recorded and reproduced to and from the optical disk 11. A spherical aberration may occur during a continuous recording or reproducing operation if the wavelength of a laser beam changes due to a temperature change during the operation.

Recording and reproducing information signals and correcting an aberration may be carried out in a time divisional manner, so that an aberration is corrected during a recording or reproducing operation to always correctly achieve the recording or reproducing operation without errors.

The invention claimed is:

1. An optical disk unit having reproducer for reproducing information recorded in an information recording layer of an optical disk, comprising:
   a laser beam source;
   an aberration corrector to correct a spherical aberration by adjusting the diverging or converging angle of a laser beam emitted from the laser beam source;
   an objective lens to condense the laser beam and form a condensed beam spot on the information recording layer;
   a focus controller having a moving mechanism to move the objective lens along an optical axis of the laser beam, the focus controller moving the objective lens so that the condensed beam spot focuses on the information recording layer;
   a detector capable of allowing the focus controller to move the objective lens by a predetermined distance from an in-focus position in a first direction, allowing the reproducer to reproduce a random signal having a plurality of amplitudes and periods from an area of the information recording layer, extracting a specific portion having a specific amplitude or period from the reproduced random signal or an interpolated signal thereof, finding a first amplitude value in the specific portion, allowing the focus controller to move the objective lens by the predetermined distance from the in-focus position in a second direction that is opposite to the first direction, allowing the reproducer to reproduce a random signal having a plurality of amplitudes and periods from the area of the information recording layer, extracting a specific portion having a specific amplitude or period from the reproduced random signal or an interpolated signal thereof, and finding a second amplitude value from the specific portion;
   a control unit capable of controlling the aberration corrector so that the difference between the first amplitude value and the second amplitude value approaches zero;
   a determiner capable of determining whether or not the information recording layer has a record to reproduce a random signal by the detector; and
   a recorder capable of recording a random signal having a plurality of amplitudes and periods in the area of the information recording layer if the determiner determines that the information recording layer has no record to reproduce a random signal by the detector.

2. The optical disk unit as set forth in claim 1, wherein: the area is an OPC area.

3. The optical disk unit as set forth in claim 1, wherein: the detector is an envelope detector to detect envelopes in the specific portions and find the first and second amplitude values.

4. An optical disk unit having a reproducer for reproducing information recorded in an information recording layer of an optical disk, comprising:
   a laser beam source;
   an aberration corrector to correct a spherical aberration by adjusting the diverging or converging angle of a laser beam emitted from the laser beam source;
   an objective lens to condense the laser beam and form a condensed beam spot on the information recording layer;
   a focus controller having a moving mechanism to move the objective lens along an optical axis of the laser beam, the focus controller moving the objective lens so that the condensed beam spot focuses on the information recording layer;
   a detector for allowing the focus controller to move the objective lens by a predetermined distance from an in-focus position in a first direction, allowing the reproducer to reproduce a random signal having a plurality of amplitudes and periods from the area of the information recording layer, extracting a first specific portion having a first specific amplitude or period and a second specific portion having a second specific amplitude or period from the reproduced random signal or an interpolated signal thereof, finding a first differential value between an amplitude value of the first specific portion and an amplitude value of the second specific portion, allowing the focus controller to move the objective lens by the predetermined distance from the in-focus position in a second direction that is opposite to the first direction, allowing the reproducer to reproduce a random signal having a plurality of amplitudes and periods from the optional area of the information recording layer, extracting a third specific portion having a third specific amplitude or period and a fourth specific portion having a fourth specific amplitude or period from the reproduced random signal or an interpolated signal thereof, and finding a second differential value between an amplitude value of the third specific portion and an amplitude value of the fourth specific portion;
   a control unit capable of controlling the aberration corrector so that the difference between the first differential value and the second differential value approaches zero;
   a determiner capable of determining whether or not the information recording layer has a record to reproduce a random signal by the detector; and
   a recorder capable of recording a random signal having a plurality of amplitudes and periods in the area of the information recording layer if the determiner determines that the information recording layer has no record to reproduce a random signal by the detector.

5. The optical disk unit as set forth in claim 4, wherein: the area is an OPC area.

6. An optical disk unit having a reproducer for reproducing information recorded in an information recording layer of an optical disk, comprising:
   a laser beam source;
   an aberration corrector to correct a spherical aberration by adjusting the diverging or converging angle of a laser beam emitted from the laser beam source;
   an objective lens to condense the laser beam and form a condensed beam spot on the information recording layer;
   a focus controller having a moving mechanism to move the objective lens along an optical axis of the laser beam, the focus controller moving the objective lens so that the condensed beam spot focuses on the information recording layer;
   a detector for allowing the focus controller to move the objective lens by a predetermined distance from an in-focus position in a first direction, allowing the reproducer to reproduce a random signal having a plurality of amplitudes and periods from the area of the information recording layer, extracting a first specific portion having a first specific amplitude or period and a second specific portion having a second specific amplitude or period from the reproduced random signal or an interpolated signal thereof, finding a first differential value between an amplitude value of the first specific portion and an amplitude value of the second specific portion, allowing the focus controller to move the objective lens by the predetermined distance from the in-focus position in a second direction that is opposite to the first direction, allowing the reproducer to reproduce a random signal having a plurality of amplitudes and periods from the optional area of the information recording layer, extracting a third specific portion having a third specific amplitude or period and a fourth specific portion having a fourth specific amplitude or period from the reproduced random signal or an interpolated signal thereof, and finding a second differential value between an amplitude value of the third specific portion and an amplitude value of the fourth specific portion; and a control unit capable of controlling the aberration corrector so that the difference between the first differential value and the second differential value approaches zero, wherein the detector comprises:

a zero-cross detector capable of detecting a zero-cross point where the reproduced random signal or an interpolated signal thereof crosses a preset zero level;

a time interval detector capable of detecting a time interval between two adjacent zero-cross points; and an extractor capable of extracting the first to fourth specific portions according to time intervals detected by the time interval detector.

7. An optical disk unit having a reproducer for reproducing information recorded in an information recording layer of an optical disk, comprising:

a laser beam source;

an aberration corrector to correct a spherical aberration by adjusting the diverging or converging angle of a laser beam emitted from the laser beam source;

an objective lens to condense the laser beam and form a condensed beam spot on the information recording layer;

a focus controller having a moving mechanism to move the objective lens along an optical axis of the laser beam, the focus controller moving the objective lens so that the condensed beam spot focuses on the information recording layer;

a detector for allowing the focus controller to move the objective lens by a predetermined distance from an in-focus position in a first direction, allowing the reproducer to reproduce a random signal having a plurality of amplitudes and periods from an area of the information recording layer, extracting a first specific portion having a first specific amplitude or period and a second specific portion having a second specific amplitude or period from the reproduced random signal or an interpolated signal thereof, finding a first differential value between an amplitude value of the first specific portion and an amplitude value of the second specific portion, allowing the focus controller to move the objective lens by the predetermined distance from the in-focus position in a second direction that is opposite to the first direction, allowing the reproducer to reproduce a random signal having a plurality of amplitudes and periods from the area of the information recording layer, extracting a third specific portion having a third specific amplitude or period and a fourth specific portion having a fourth specific amplitude or period from the reproduced random signal or an interpolated signal thereof, and finding a second differential value between an amplitude value of the third specific portion and an amplitude value of the fourth specific portion; and a control unit capable of controlling the aberration corrector so that the difference between the first differential value and the second differential value approaches zero, wherein the detector comprises:

a zero-cross detector capable of detecting a zero-cross point where the reproduced random signal or an interpolated signal thereof crosses a preset zero level;

a partial response determiner capable of using zero-cross points detected by the zero-cross detector and the reproduced random signal or an interpolated signal thereof, to determine a target value for each sampling point of the reproduced random signal or an interpolated signal thereof according to run-length limitation and state transition determined by partial response characteristics; and an extractor capable of extracting the first to fourth specific portions according to target values determined by the partial response determiner.

8. An aberration correcting method used for an optical disk unit, comprising:

a reproducing step of reproducing a random signal having a plurality of amplitudes and periods from an area of an information recording layer of an optical disk a focusing step of moving an objective lens along an optical axis, to condense a laser beam emitted from a laser beam source on the information recording layer and focus the condensed beam spot on the information recording layer;

a first detecting step of moving the objective lens by a predetermined distance from the in-focus position set in the focusing step in a first optical axis direction, reproducing the random signal, extracting a specific portion having a specific amplitude or period from the reproduced random signal or an interpolated signal thereof, and finding a first amplitude value in the specific portion;

a second detecting step of moving the objective lens by the predetermined distance from the in-focus position set in the focusing step in a second direction that is opposite to the first direction, reproducing the random signal, extracting a specific portion having a specific amplitude or period from the reproduced random signal or an interpolated signal thereof, and finding a second amplitude value in the specific portion; and a controlling step of controlling an aberration corrector that corrects a spherical aberration by adjusting the diverging or converging angle of the laser beam, so that the difference between the first amplitude value and the second amplitude value approaches zero, the aberration correcting method further comprising before the reproducing step:

a determining step of determining whether or not the information recording layer has a record to reproduce a random signal in the first and second detecting steps; and a recording step of recording a random signal having a plurality of amplitudes and periods in the area of the information recording layer if the determining step determines that the information recording layer has no record to reproduce a random signal in the first and second detecting steps.

9. The aberration correcting method used for an optical disk unit as set forth in claim 8, wherein:

the area is an OPC area.

10. The aberration correcting method used for an optical disk unit as set forth in claim 8, wherein:
the first and second detecting steps are envelope detecting steps of detecting envelopes in the specific portions and finding the first and second amplitude values.

11. An aberration correcting method used for an optical disk unit, comprising:
a reproducing step of reproducing a random signal having a plurality of amplitudes and periods from an area of an information recording layer of an optical disk;
a focusing step of moving an objective lens along an optical axis, to condense a laser beam emitted from a laser beam source on the information recording layer and focus the condensed beam spot on the information recording layer;
a first detecting step of moving the objective lens by a predetermined distance from the in-focus position set in the focusing step in a first optical axis direction, reproducing the random signal, extracting a first specific portion having a first specific amplitude or period and a second specific portion having a second specific amplitude or period from the reproduced random signal or an interpolated signal thereof, and finding a first differential value between an amplitude value of the first specific portion and an amplitude value of the second specific portion;
a second detecting step of moving the objective lens by the predetermined distance from the in-focus position set in the focusing step in a second direction that is opposite to the first direction, reproducing the random signal, extracting a third specific portion having a third specific amplitude or period and a fourth specific portion having a fourth specific amplitude or period from the reproduced random signal or an interpolated signal thereof, and finding a second differential value between an amplitude value of the third specific portion and an amplitude value of the fourth specific portion; and
a controlling step of controlling an aberration corrector that corrects a spherical aberration by adjusting the diverging or converging angle of the laser beam, so that the difference between the first differential value and the second differential value approaches zero,
the aberration correcting method further comprising before the reproducing step:
a determining step of determining whether or not the information recording layer has a record to reproduce a random signal in the first and second detecting steps; and
a recording step of recording a random signal having a plurality of amplitudes and periods in the area of the information recording layer if the determining step determines that the information recording layer has no record to reproduce a random signal in the first and second detecting steps.

12. The aberration correcting method used for an optical disk unit as set forth in claim 11, wherein: the area is an OPC area.

13. An aberration correcting method used for an optical disk unit, comprising:
a reproducing step of reproducing a random signal having a plurality of amplitudes and periods from an area of an information recording layer of an optical disk;
a focusing step of moving an objective lens along an optical axis, to condense a laser beam emitted from a laser beam source on the information recording layer and focus the condensed beam spot on the information recording layer;
a first detecting step of moving the objective lens by a predetermined distance from the in-focus position set in the focusing step in a first optical axis direction, reproducing the random signal, extracting a first specific portion having a first specific amplitude or period and a second specific portion having a second specific amplitude or period from the reproduced random signal or an interpolated signal thereof, and finding a first differential value between an amplitude value of the first specific portion and an amplitude value of the second specific portion;
a second detecting step of moving the objective lens by the predetermined distance from the in-focus position set in the focusing step in a second direction that is opposite to the first direction, reproducing the random signal, extracting a third specific portion having a third specific amplitude or period and a fourth specific portion having a fourth specific amplitude or period from the reproduced random signal or an interpolated signal thereof, and finding a second differential value between an amplitude value of the third specific portion and an amplitude value of the fourth specific portion; and
a controlling step of controlling an aberration corrector that corrects a spherical aberration by adjusting the diverging or converging angle of the laser beam, so that the difference between the first differential value and the second differential value approaches zero, wherein the first and second detecting steps include:
a zero-cross detecting step of detecting a zero-cross point where the reproduced random signal or an interpolated signal thereof crosses a preset zero level;
a time interval detecting step of detecting a time interval between two adjacent zero-cross points; and
an extracting step of extracting the first to fourth specific portions according to time intervals detected in the time interval detecting step.

14. An aberration correcting method used for an optical disk unit, comprising:
a reproducing step of reproducing a random signal having a plurality of amplitudes and periods from an area of an information recording layer of an optical disk;
a focusing step of moving an objective lens along an optical axis, to condense a laser beam emitted from a laser beam source on the information recording layer and focus the condensed beam spot on the information recording layer;
a first detecting step of moving the objective lens by a predetermined distance from the in-focus position set in the focusing step in a first optical axis direction, reproducing the random signal, extracting a first specific portion having a first specific amplitude or period and a second specific portion having a second specific amplitude or period from the reproduced random signal or an interpolated signal thereof, and finding a first differential value between an amplitude value of the first specific portion and an amplitude value of the second specific portion;
a second detecting step of moving the objective lens by the predetermined distance from the in-focus position set in the focusing step in a second direction that is opposite to the first direction, reproducing the random signal, extracting a third specific portion having a third specific amplitude or period and a fourth specific portion having a fourth specific amplitude or period from the reproduced random signal or an interpolated signal thereof, and finding a second differential value between an amplitude value of the third specific portion and an amplitude value of the fourth specific portion; and
a controlling step of controlling an aberration corrector that corrects a spherical aberration by adjusting the diverging or converging angle of the laser beam, so that the difference between the first differential value and the second differential value approaches zero, wherein the first and second detecting steps include:
a zero-cross detecting step of detecting a zero-cross point where the reproduced random signal or an interpolated signal thereof crosses a preset zero level;
a partial response determining step of using zero-cross points detected in the zero-cross detecting step and the reproduced random signal or an interpolated signal thereof and determining a target value for a sampling point of the reproduced random signal or an interpolated signal thereof according to run-length limitation and state transition determined by partial response characteristics; and
an extracting step of extracting the first to fourth specific portions according to target values determined in the partial response determining step.

* * * * *

UNITED STATES PATENT AND TRADEMARK OFFICE
CERTIFICATE OF CORRECTION

PATENT NO.       : 7,542,385 B2                                    Page 1 of 1
APPLICATION NO.  : 10/538488
DATED            : June 2, 2009
INVENTOR(S)      : Junichiro Tonami It is certified that error appears in the above-identified patent and that said Letters Patent is hereby corrected as shown below:

Claim 4, Column 32, Lines 22-23:

Please delete "...the optional area...,"

and replace with

-- the area --

Claim 6, Column 33, Lines 8-9:

Please delete "...the optional area...,"

and replace with

-- the area --

Claim 7, Column 33, Line 50:

Please delete "...from an area...,"

and replace with

-- from the area --

Signed and Sealed this

Fourth Day of August, 2009

JOHN DOLL
*Acting Director of the United States Patent and Trademark Office*